(12) United States Patent
Arnold et al.

(10) Patent No.: US 8,281,307 B2
(45) Date of Patent: Oct. 2, 2012

(54) VIRTUAL SOLUTION COMPOSITION AND DEPLOYMENT SYSTEM AND METHOD

(75) Inventors: William C. Arnold, Newburgh, NY (US); Tamar Eilam, New York, NY (US); Michael H. Kalantar, Chapel Hill, NC (US); Alexander V. Konstantinou, New York, NY (US); John A. Pershing, Cortlandt Manor, NY (US); Edward C. Snible, Bronx, NY (US); Alexander A. Totok, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 12/476,006

(22) Filed: Jun. 1, 2009

(65) Prior Publication Data

US 2010/0306772 A1    Dec. 2, 2010

(51) Int. Cl.
  G06F 9/455 (2006.01)
  G06F 9/46 (2006.01)
  G06F 9/44 (2006.01)
  G06F 15/16 (2006.01)

(52) U.S. Cl. ............ 718/1; 718/106; 717/101; 717/104; 717/105; 717/110; 717/111; 717/113; 717/120; 717/121; 709/227

(58) Field of Classification Search .................... None
See application file for complete search history.

(56) References Cited

U.S. PATENT DOCUMENTS

2006/0230314 A1    10/2006   Sanjar et al.
2007/0055972 A1     3/2007   Brown et al.
2007/0078988 A1*    4/2007   Miloushev et al. ........... 709/227

OTHER PUBLICATIONS

Lutterkort et al., "Manageable Virtual Appliances", Jun. 2007, Proceedings of the Linux Symposium, Canada, pp. 293-302.*
Smith et al, "IBM e-Business Technology, Solution, and Design Overview", 2004, IBM RedBooks, Student Edition.*
Krsul, Ivan, et al., "VMPlants: Providing and Managing Virtual Machine Execution Environments for Grid Computing," 2004-IEEE, 0-7695-2153-3/04.
Hnetynka, Petr, "A Model-driven Environment for Component Deployment," Proceedings of the 2005 Third ACIS Int'l Conference on Engineering Research, Management and Applications (SERA'05), 0-7695-2297-1/05, copyright 2005 IEEE.
Hall, Richard S., et al., "Evaluating Software Deployment Languages and Schema—An Experience Report," KnowledgeGate from IBM Market Insights; downloaded Dec. 16, 2008 from IEEE Xplore.

(Continued)

*Primary Examiner* — Jennifer To
*Assistant Examiner* — Bing Zhao
(74) *Attorney, Agent, or Firm* — Jose Gutman; Fleit Gibbons Gutman Bongini & Bianco PL

(57) ABSTRACT

A method and information processing system are provided for creating a virtual part and for composing and deploying a virtual solution with one or more virtual parts. The virtual part includes: a virtual image including a set of compatible software components; a set of configurability points, each configurability point defining at least one parameter of the virtual part that is configurable; a set of virtual ports, wherein each virtual port indicates at least one of a set of virtual parts required by the virtual part and a set of virtual parts that are compatible with the virtual part; and a set of configuration scripts adapted to reconfigure the virtual image.

21 Claims, 12 Drawing Sheets

OTHER PUBLICATIONS

Dearle, Alan, "Software Deployment, Past, Present and Future," Future of Software Engineering (FOSE'07), 0-07695-2829-5/07, copyright 2007 IEEE.

Hall, Richard S., et al, "A Cooperative Approach to Support Software Deployment Using the Software Dock," ICSE'99 Los Angeles, CA, 1-58113-074-0/99/05, copyright ACM 1999.

Balasubramania, Krishnakumar, et al., "Model Driven Middleware: A New Paradigm for Developing and Provisionaling Distributed Real-time and Embedded Applications," Science of Computer Programming, Nov. 14, 2003.

Kecskemeti, Gabor, "Automatic Service Deployment Using Virtualisation," 0-7695-3089-3/08, copyright 2008 IEEE.

* cited by examiner

VIRTUAL SOLUTION COMPOSITION AND DEPLOYMENT SYSTEM AND METHOD

CROSS-REFERENCE TO RELATED APPLICATIONS

This application is U.S. Pat. No. 8,074,218, entitled "Method and System for Constructing Virtual Resources", filed on Mar. 29, 2007, and is also related to U.S. Pat. No. 8,196,089, entitled "Pattern-Based Development of Computer System Solutions", filed on Oct. 9, 2007, and is also related to the now abandoned U.S. patent application Ser. No. 11/734,549, entitled "Method for Improved Image-Customization By Use of Embedded Metadata", filed on Apr. 12, 2007; the collective entire disclosure of which being hereby incorporated by reference.

FIELD OF THE INVENTION

The present invention generally relates to computing system virtualization technologies, and more particularly relates to composing and deploying virtual solutions using reusable virtual parts.

BACKGROUND OF THE INVENTION

Today, most businesses rely on complex information technology (IT) infrastructure for day to day operations. A user, such as a system administrator or operator, may manage this complex IT infrastructure by, for example, installing software, configuring firewalls, and updating software by installing patches. Managing this complex IT infrastructure requires flexibility and agility based on the need of the business. However, the total cost of ownership of complex IT infrastructures is continuously increasing. Analysts attribute this increasing cost to several factors, such as heterogeneity of resources, large scale, complex software, and interdependencies, that cut across layers and hosting environments.

To address these increasing cost challenges, businesses are beginning to adopt virtualization technologies, such as, for example, VMware (available from VMware, Inc. Palo Alto, Calif.), and XEN (open source virtualization software). Such virtualization technologies enable a user to seamlessly partition resources of a single physical machine into multiple virtual machines. Each virtual machine runs its own operating system (OS) and software stack. Thus, virtualization technology may relieve businesses from dealing with different types of hardware and OSs and the associated costs. In addition, this virtualization technology may allow businesses to better utilize resources of physical machines or containers without jeopardizing isolation and security.

However, while this virtualization technology may eliminate dependencies on hardware and OSs, deploying a solution composed of multiple components on an OS container is still a complex and laborious task due to the many interdependencies that exist between software products, especially if they need to be configured to work together.

SUMMARY OF THE INVENTION

According to one embodiment, a virtual part is provided for composing a virtual solution. The virtual part comprises: a virtual image comprising a set of compatible software components; a set of configurability points, wherein each configurability point in the set of configurability points defines at least one parameter of the virtual part that is configurable by a user during virtual solution composition or deployment, wherein virtual solution composition comprises associating at least a first virtual part to operate with at least a second virtual part; a set of virtual ports, wherein each virtual port within the set of virtual ports indicates at least one of a set of virtual parts required perhaps optionally by the virtual part comprising the set of virtual ports and a set of virtual parts that are compatible with the virtual part; and a set of configuration scripts adapted to reconfigure the virtual image based on at least one of a virtual part associated with the virtual part comprising the set of configuration scripts and an operating environment associated with the virtual part comprising the configuration scripts.

In another embodiment, a method, with an information processing system, is useful for creating a virtual part for composing a virtual solution. The method comprises: receiving a user's selection of at least one virtual image; associating a set of configurability points with the virtual image; setting, in response to associating the set of configurability points, at least one parameter of the virtual part as configurable by a user during virtual solution composition or deployment, wherein virtual solution composition comprises associating at least a first virtual part to operate with at least a second virtual part; generating a set of virtual ports, wherein each virtual port within the set of virtual ports indicates at least one of a set of virtual parts required perhaps optionally by the virtual part comprising the set of virtual ports and a set of virtual parts that are compatible with the virtual part; receiving a set of configuration operations from the user, wherein the set of configuration operations are adapted to reconfigure the virtual image based on at least one of a virtual part associated with the virtual part comprising the set of configuration operations and an operating environment associated with the virtual part comprising the configuration operations; and generating a virtual part comprising at least the virtual image, the set of configurability points, the set of virtual ports, and the configuration operations.

In yet another embodiment, a method, with an information processing system, is provided for composing a virtual solution, the method comprising: receiving a user's selection of a first virtual part and at least a second virtual part, wherein a virtual part comprises at least: a virtual image comprising a set of software components, a set of configurability points, wherein each configurability point within the set of configurability points defines at least one parameter of the virtual part comprising the set of configurability points that is configurable by a user, a set of virtual ports, wherein each virtual port within the set of virtual ports indicates at least one of a set of virtual parts required perhaps optionally by the virtual part comprising the set of virtual ports and a set of virtual parts that are compatible with the virtual part, and a set of configuration operations adapted to reconfigure the virtual image; prompting, in response to receiving the user's selection, the user to provide a set of parameter values for at least one of the first and second virtual parts based on the set of configurability points; receiving the set of parameter values; reconfiguring the virtual image within the at least one of the first and second virtual parts based on the set of received parameter values and the set of configuration operations, and generating, in response to reconfiguring the virtual image, a virtual solution comprising the first virtual part, the second virtual part, and the virtual image that has been reconfigured. It should be noted that, according to certain embodiments, a virtual solution may contain a single virtual part.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
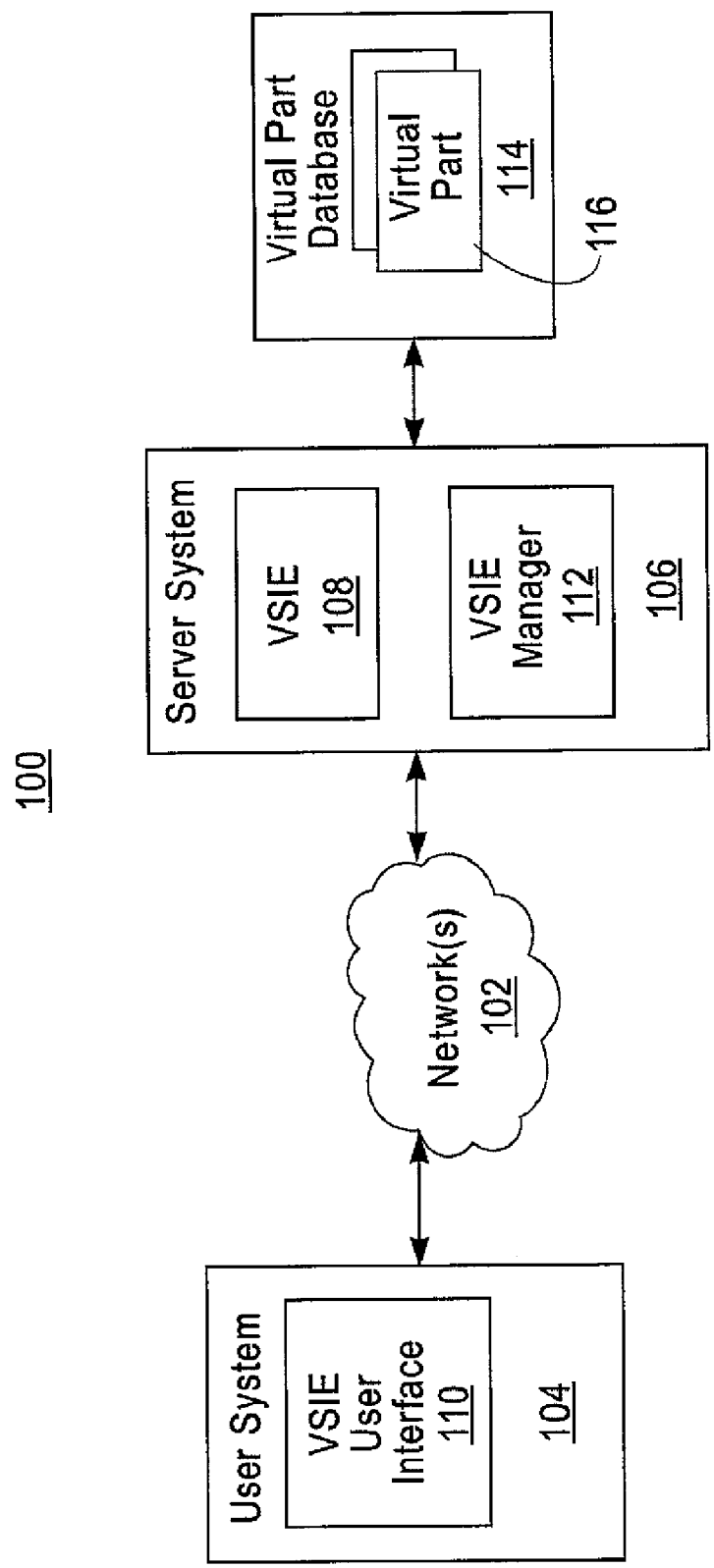
FIG. 1 is a block diagram illustrating one example of an operating environment according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The various embodiments of the present invention are advantageous because they include an approach and architecture for composition and deployment of virtual software services in cloud environments. A virtual part model treats virtual images as building blocks for composite solutions. Virtual parts use a port abstraction to negotiate their communication parameters. A solution architect, using one or more embodiments of the present invention, is able to create a virtual solution model by composing virtual parts and defining requirements on the environment in a cloud-independent manner. The virtual solution model is transformed to a cloud-specific virtual solution deployment model used to generate a parameterized deployment plan that can be executed by a relatively unskilled user.

Virtual Solutions

The deployment of a software service typically involves the installation of software artifacts, the installation and configuration of middleware containers such as web servers, application servers, databases, messaging engines, and directories, and the configuration of the infrastructure for communication, isolation, and security. Server virtualization technology has provided a powerful solution to the challenge of assembling software stacks. Deployers can now utilize virtual images capturing complete and functional stacks that have been assembled by middleware experts. The emergence of the cloud computing paradigm supporting the provisioning of an Infrastructure-as-a-Service (IaaS) has similarly radically simplified the provisioning of hardware resources to run virtual images and the configuration of their placement and network connectivity. The combination of virtualization and IaaS therefore holds the potential to revolutionize software service life-cycle management. However, several key challenges are yet to be addressed by conventional systems to fulfill the promise.

For example, a first challenge is with respect to solution design. The structure of a multi-machine virtual software service depends on a large number of cross-cutting functional and non-functional concerns such as availability, security, performance, and cost. Solution architects must make architectural decisions on the use and type of application server clustering technology, authentication services, data storage, as well as the grouping of components into network zones, and the selection of deployment site. Leveraging pre-built virtual machines as solution components reduces the solution design space, but the number of possible combinations and concerns is still high, and their interplay complicated.

A second challenge is with respect to software stack cross-configuration. The service architecture and topological structure dictate multiple cross-configurations of the virtual machines comprising the service. Application servers will have to be configured to use authentication servers, access databases, and be federated in clusters and cells. Cross-machine configurations cannot be statically captured ("freeze dried") on the combined set of virtual machines, since they will vary across solutions. Therefore, the needed configurations must be inferred and implemented at deployment time based on the solution design. Dependencies must be respected to consistently configure all components of a service. Often, the value of a property exposed by one component must be used to configure multiple other components. Parameterized values, satisfying all component constraints, must be selected consistently. Therefore configuring the dynamic parts of a solution is still complex and error prone.

A third challenge is with respect to cloud environment configuration. The cloud infrastructure, including the virtual hardware, network, and storage, must be configured for communication, security, availability, and isolation based on the solution's requirements. The capabilities and interfaces for environment configuration vary significantly across clouds. Solution-level environment requirements must be translated to cloud-specific configurations and interface calls. Certain clouds may offer functionality too weak to meet the requirements of the service. Thus, the relationship between service requirements and cloud capabilities must be analyzed to identify the cloud most suitable for deployment.

A fourth challenge is with respect to automating the deployment. Deploying a distributed software service requires the determination and execution of a non-trivial sequence of cloud interface calls to load and control images and to configure the cloud environment. The calls and their parameters are specific to each service and cloud environment configuration. Temporal dependencies must be taken into account to correctly implement the deployments. The inventors have discovered and created a novel approach and architecture leveraging virtualization and IaaS for software service composition and deployment which addresses the above challenges.

Various embodiments of the presently claimed invention overcome the challenges discussed above by leveraging virtualization and IaaS for software service composition and deployment. The various embodiments reduce the design space by leveraging coarse-grained image building blocks. The various embodiments also enable cloud-agnostic modeling of solution environment requirements which can be transformed into cloud-specific configurations and be used to automatically generate a deployment plan.

Operating Environment

According to one embodiment, FIG. 1 illustrates one example of an operating environment/system 100 for virtual solution composition and deployment. In particular, FIG. 1 shows one or more networks 102 that, in one embodiment, can include wide area networks, local area networks, wireless networks, and/or the like. In one embodiment, the environment 100 includes a plurality of information processing systems 104, 106 that are communicatively coupled to the network(s) 102. The information processing systems 104, 106 include one or more user systems 104 and one or more servers 106. The user systems 104 can include, for example, information processing systems such as desktop computers, laptop computers, wireless devices such as mobile phones, personal digital assistants, and the like.

The server system 106, for example, includes a virtual solution interactive environment (VSIE) 108 that users of the user systems 104 interact with via a user interface 110 or programmatically via an API. The VSIE 108, in one embodiment, comprises a tool that includes at least one of an application(s), a website, a web application, a mashup, or the like, that is used to create virtual parts and to compose and deploy virtual solutions. The server system 106, in one embodiment, also comprises a VSIE manager 112 that monitors and manages a user's interaction with the VSIE 108 and the creation of virtual solutions via the VSIE 108. The VSIE 108 and the VSIE manager 112 will be discussed in greater detail below.

The VSIE 108 allows a user to create virtual parts 116 (discussed below) that can be used to compose virtual solutions. For example, a solution architect designs a solution via the VSIE 108 by graphically selecting virtual parts 116 and connecting them together. The solution architect provides input through defined customization points, including (but not limited to): connectivity, functional and non-functional configuration requirements and deployment requirements. The task of solution design becomes easier since many of the fine grained configuration choices have been already made. A small base set of virtual parts can be used to assemble a large set of virtual solutions. A solution can be automatically packaged via the VSIE manager 112, where images are pre-configured based on the choices made at composition. The solution is packaged along with metadata describing the deployment requirements on the environment and deployment points of variability. In addition, software stack configuration logic to support deployment points of variability is packaged along with the solution.

In addition, the VSIE 108 allows a user to deploy a solution as well. For example, a deployment module within the VSIE 108 consumes the solution description; identifies appropriate physical resources in accordance with the deployment requirements; instantiates the images that are part of the solution; collects input from the deployer in accordance with the deployment points of variability described in the metadata; and exercises the software stack re-configuration logic to address these points of variability, packaged together with the solution. One or more embodiments of the present invention provide the input for this deployment phase.

In one embodiment, one or more databases or other storage devices 114 are communicatively coupled to the server system 106. This database 114, for example, comprises a plurality of virtual parts that are created using the VSIE 108, or can be preconfigured and imported into the database 114. It should be noted that the terms "virtual appliance" and "virtual part" may be used interchangeably throughout this discussion. Virtual parts 116 serve as building blocks for solution composition. A virtual part 116 can expose well-defined composition connectivity ports and customization points. It should be noted, however, that virtual parts may contain zero ports and 0 parameters. Virtual parts 116 also encapsulate logic to validate and re-configure software images based on user choices at composition time. A virtual part 116 also can include the specification of models (metadata), configurability points, and configuration execution logic to support downstream composition and deployment.

The virtual parts 116, in one embodiment, are reusable across multiple solutions and serve as building blocks for a user to compose virtual solutions via the VSIE 108. In one embodiment, the fixed portion and the configurable/variable portion (that may change when the part is composed with other parts in a solution) of each virtual part 116 are separated. Metadata, associated with a virtual part 116 describes the configurability points of the virtual part 116. Rules, associated with virtual parts 116 can be used to govern and filter invalid composition decisions. Configuration logic, associated with the virtual parts 116 can support automating configuration changes, driven by valid composition choices at solution composition. These rules and configuration logic comprise the configuration operations of a virtual part. The virtual part 116 is discussed in greater detail below.

In one embodiment, users such as domain experts construct virtual parts 116, which can be implemented by virtual images with pre-built configurability points for self and cross configuration, using the VSIE 110 via the VSIE user interface 108. The virtual part model exposes these configurability points declaratively in a manner which admits simple composition with other virtual part models. Other users such as solution architects create a declarative virtual solution model (VSM) via the VSIE 108 by selecting virtual part models and specifying configurability choices (based on the manifested options). Users, such as solution architects, can further describe deployment requirements that will affect and drive virtual machine placement and network configuration.

The requirements are specified in a cloud-independent manner using abstractions such as availability zones, network zones, placement constraints, and resource consumption constraints and requirements. Users, such as deployment architects, consume a VSM and transform it, via the VSIE 108, to a cloud-specific virtual solution deployment model (VSDM) that can be further customized with additional cloud-specific configurations. Finally, the deployment model is transformed to a cloud-specific virtual solution deployment plan (VSDP) via the VSIE 108. The plan can be executed by a normal user, such as a software tester. The VSDP operates in two layers: (1) it invokes the cloud operations to configure the environment and control (load, allocate, reserve, activate) the virtual machines and (2) it exercises the virtual part built-in configuration logic to configure the software stack based on the VSM.

The VSIE 108 provides a clear separation of roles to enable the scalable capturing of deployment logic across the rich space of possible software service solution topologies and layers. Virtualization is leveraged to assign the role of stack creation to operating system, security, middleware, and scripting, experts. The resulting virtual images are hardened and expose limited customization parameters at deployment time, such as host name selection. A user, such as a cloud image expert, can then be responsible for uploading and registering each such image in clouds which can support it. Each such image self-describes the configurability choices through a part model that acts as an interface. Note that a single interface may be associated with multiple implementation choices, such as a VMware ESX image or an Amazon Machine image.

The complexity and risk faced by the solution architect is greatly reduced. Instead of having to deal with fine grained installation and complex fine-grained middleware configuration choices, the solution architect operates within the reduced space of the options exposed by the available virtual parts. This reduced space allows the solution architect to focus on key aspects (tiered architecture, technology selection, etc) rather than worry about fine-grained middleware configuration complexity, individual stack tuning options, and version compatibility issues. The VSM constructed by the solution architect is used to seamlessly calculate the activation parameters of the image and to ensure consistent composition with other images, with configuration parameters or properties of one image seamlessly propagated and used to cross-configure other dependent images. The role of the deployer is then typically limited to binding the VSM to one or more clouds and then generating and executing the deployment plan.

One or more embodiments of the present invention can be offered as a service, termed Composition-as-a-Service on top of an IaaS platform. Such a service can be used by organizations, interested in harnessing the power of cloud computing in order to reduce their infrastructure expenses (administration costs, hardware cost, etc). Typically, such organizations have advanced IT needs that go beyond usage of single software stacks captured in individual virtual machines. Such large organizations typically develop and maintain thousands of in-house composite applications (e.g. J2EE). These applications are typically tested in a sequence of test environments (integration, stress, staging) before they can be rolled into production.

Leveraging the IaaS platform, enhanced with one or more embodiments of the present invention, for application testing provides advantages to system deployers. First, security requirements on testing environments are less stringent than production. Thus, businesses can move into the cloud for testing first. Second, complete test environments can be temporarily provisioned only for the duration of the testing. Third, these environments can be frequently and easily updated with new versions of the source code For example, the virtual parts 116, in one embodiment, are updatable. Fourth, different topologies can be based on the application structure and testing needs. Lastly, an embodiment of the present invention can reduce the time to provision and configure the test environments (today 35% of testing time is spent on just configuring the test environment). Note that current Platform-as-a-Service (PaaS) offerings may be too restrictive for certain organizations since they dictate specific technologies (e.g. the .Net model in Microsoft's Azure) or application programming model (e.g. Google App Engine). Thus, such organizations will typically be forced to work in the IaaS layer, and could benefit from a Composition-as-a-Service layer, that can greatly reduce test configuration time.

Virtual Parts

Figure 2:
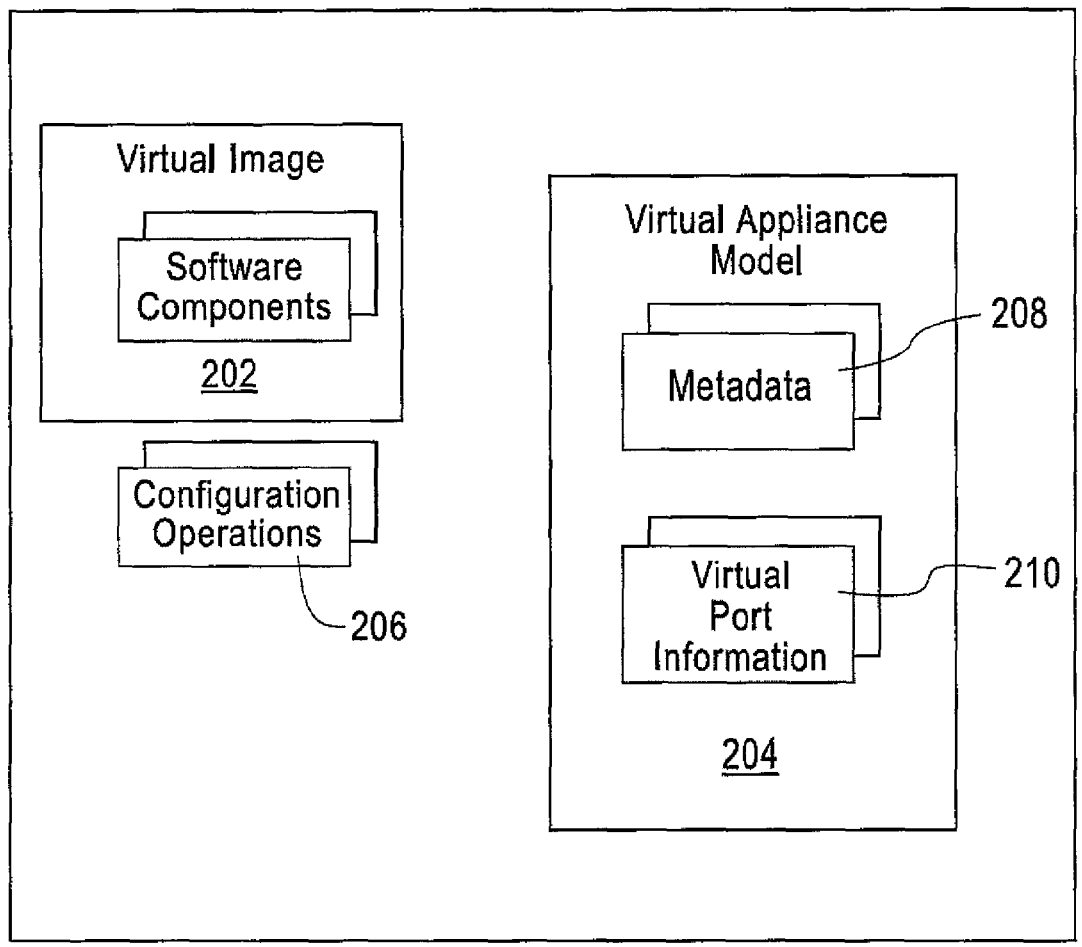
FIG. 2 is a block diagram illustrating a more detailed view of a virtual part 116 as shown in FIG. 1, according to one embodiment of the present invention.

FIG. 2 is a block diagram illustrating a more detailed view of a virtual part 116 discussed above with respect to FIG. 1. A virtual part 116, in one embodiment, comprises three interrelated parts: (1) a virtual image 202, (2) a virtual part model 204, and (3) a set of configuration operations 206. The virtual image 202 comprises one or more software components that are configured and tested to work together. The virtual part model 204 declaratively captures the ways in which the virtual image 202 can be customized at deployment time. The configuration operations 206 are the mechanisms by which the values configured in the virtual part model 204 are applied to the image 202. A configuration script is one example of an implementation of a set of configuration operations. It is possible to use the same virtual part model 204 for multiple virtual images 202 with the same customization features. For virtual part models corresponding to more than one image, the configuration operations 206 may also be the same, or differ based on their compatibility with the virtual images 202.

The virtual part model 204, in one embodiment, declaratively captures deploy time parameters in the virtual image's 202 internal configuration (i.e., internal model) such as the root password, and configuration of its external connectivity (i.e. external model) to other images in the virtual solution or other external resources. The virtual part model 204, in one embodiment, comprises two parts: packaging and composition. The packaging part comprises metadata 208 about the virtual machine in a platform independent manner. The packaging data includes product sections with the configuration attributes of different products installed on the virtual image 202, such as the operating system, and identifies the ones which the user can modify at deploy time, such as the host name.

The composition part specifies how the virtual part 116 can be connected to other virtual parts. In one embodiment, the composition part includes virtual port information 210 that indicates how the virtual image 202 can be linked. One embodiment of a virtual port is a VPort 210, a typed object that encapsulates all the properties required to affect a specific type of communication. The VPort properties often cross product sections and may overlap in their coverage with other VPorts on the same virtual image 202.

Figure 3:
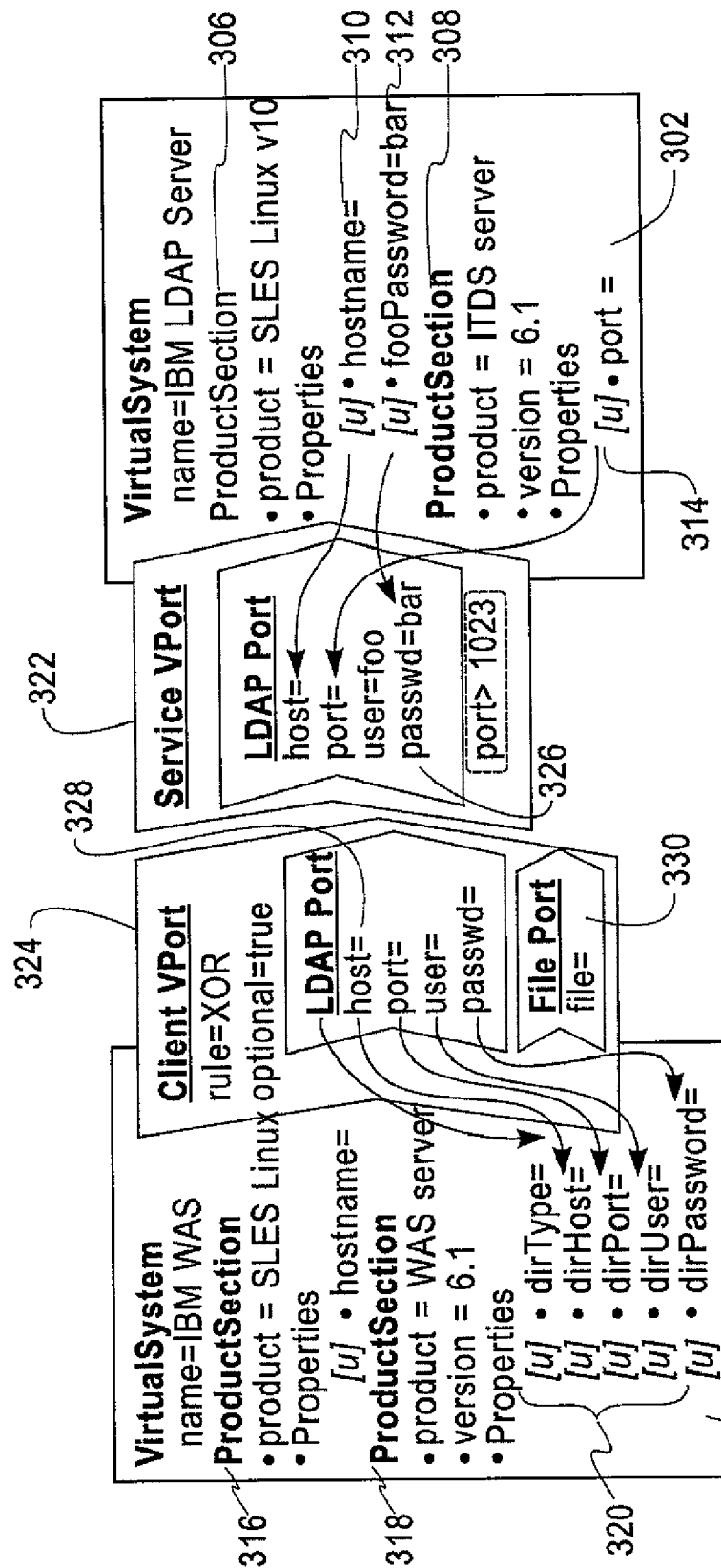
FIGS. 3 and 4 show examples of parts and virtual solution models.

The following is one example of modeling a virtual part 116 with examples of an IBM Tivoli Directory Server (ITDS) virtual part (an LDAP server), and an IBM WebSphere Application Server (WAS) virtual part (a J2EE server). Examples of the ITDS part model 302 and the WAS part model 304 are illustrated in FIG. 3. With respect to the ITDS part model 302, the packaging part exposes two product sections 306, 308, for the operating system (OS) and the ITDS LDAP server. The OS section 306 exposes two user configurable attributes: the host name 310 of the image and the password 312 of the "foo" user. The ITDS section exposes one user configurable attribute 314 specifying the LDAP network port. With respect to the model 304 for the WAS part, the WAS part includes two sections 316, 318, one for the OS and another for the WebSphere server. The section on the WAS server includes user settable attributes 320 for optionally delegating configuration to a directory server.

In one embodiment, VPorts 322, 324 are used to capture the composition parts of the ITDS and WAS parts of FIG. 3. Each VPort 322, 324 captures properties to effect a specific linkage independent of where they are defined in the product section 306, 308, 318. A number of reusable VPort patterns can be identified. For example, there can be server ports and client ports. There can alternatively be peer-to-peer ports (e.g., where values are propagated in both directions). Many different types of virtual port arrangements are also contemplated by the present invention, as should be understood from the present discussion. For the specific example, a basic client-server communication pattern, the ITDS server is modeled as a "Service VPort" 322 (e.g., a server port) and the WAS authentication client as a "Client VPort" 324 (e.g., a client port). The ITDS Service VPort 322 includes a single LDAP VPort 326. The LDAP VPort 326 exposes the host name and port number of the network service as well as the user name and password with which to authenticate using the LDAP protocol.

The values for the host, port, and password properties are propagated from the product sections 306, 308, while the user name, in this example, is hard-coded as it is not exposed as a product section attribute. In contrast, the WAS Client VPort 324 includes two ports: an LDAP VPort 328 and a File VPort 330. The Client VPort 324 is marked as optional, to indicate that it need not be connected or activated. The Client VPort's containment semantics are declared as Boolean XOR, meaning that only one of the two contained ports may be connected. The LDAP VPort 328 properties are propagated to the WAS product section parameters. The dirType parameter is set based on the type of the connected contained VPort (LDAP or File). The XML representation of the VPorts in this example is shown below in Table 1.

TABLE 1

```
<serviceVPort>
    <ldapAtomicPort host="" port="1099" user="foo" passwd="bar">
        <attributeMetaData attribute="user" mutable="false"/>
        <attributeMataData attribute="Passwd" mutable="false"/>
        <rangeConstraint attribute="port" minValue="1024"/>
    </ldapAtomicPort>
</serviceVport>
<clientVPort containmentRule="XOR" optional="true"
             connected="false">
    <ldapAtomicPort host="" port="" user="" passwd=""/>
    <fileAtomicPort file=""/>
</clientVPort>
```

Service VPorts are used to model a server offering a shared access point that does not require per-client customization. A Service VPort comprises a single atomic port, which is a typed object representing an individual non-divisible connectivity specification. Because Service VPorts represent a service to which multiple clients may connect, its properties are to be consistently propagated to all clients. Where there is choice, such as the protocol to use, the model can expose multiple Service VPorts (e.g., server ports). Client VPorts (e.g., client ports) are used to represent the client side in the client-server communication pattern that is to be configured for communication with the server. A Client VPort is associated with a connection state. When it is disconnected, some of the properties may be blank, while when it is connected, its properties are expected to be set through a negotiation process which will be discussed below.

A client VPort may be "optional" if the virtual image can function with the VPort in a disconnected state. Client VPorts can have a nested port structure to allow modeling of complex port connection strategies. The containmentRule property specifies how the Client VPort connection state relates to the connection state of the contained atomic ports. When an individual atomic port is connected to an atomic port on the target Service VPort, their types match and there should be a set of negotiated atomic port property values that satisfies the constraints on both sides. It should be noted that the Client/Server VPort is just possible type of VPort pattern. For example, in certain virtual solutions there may be peer-to-peer VPort patterns.

VPorts and their properties may be associated with constraints. For example, a constraint on the WAS server may state that the LDAP server to which it is connected be limited to a specific set of supported products. Another type of constraint may express requirements on the communication infrastructure between the two servers. For example, the ITDS port will use TCP communication over the specified port to the LDAP server. For ports which depend on link-layer dynamic configuration protocols, a constraint may require, for example, collocation of the two endpoints over the same LAN (or VLAN). The values of properties may also be constrained. For example, if the LDAP server is running as a non-root user, a constraint may restrict user port selection to over 1023.

With respect to the representation of the packaging part of the virtual part model, the Open Virtualization Format (OVF) specification can be used in one embodiment. (See, for example, DMTF. Open Virtualization Format Specification. Technical Report DSP0243, DMTF, 2009, which is hereby incorporated by reference in its entirety). An OVF Envelope document, in this embodiment, is used to capture virtual part hardware attributes, such as memory, number of CPUs, I/O interfaces, disks, and network interfaces, as well as the product sections. The OVF model is extensible, and therefore the VPort XML models of various embodiments of the present invention can be embedded, examples of which are shown above in Table 1, as an additional element of the OVF envelope. As a result the combined packaging and composition virtual part model can be represented in a single XML document that is standard compliant (OVF explicitly supports extensions of the type of the various embodiments).

Product sections comprising user configurable attributes are to be associated with one or more configuration operations (COs) that reconfigure the virtual image 202. The set of operations does not only depend on the individual products whose configuration is exposed, but may also depend on the composition of the stack. For example, some middleware containers cache the host name of a server, can break if a change at the OS level configuration is not accompanied by middleware-level configuration changes. The domain expert captures such internal propagations in the process of associating configuration operations to product sections.

In one embodiment, there are three types of configuration operations based on the context of their execution: (1) local COs are to be executed within the image, and thus necessitate its deployment, (2) remote COs can be executed on another host, but require the image to be reachable in order to perform remote management calls, and (3) off-line COs are executed on a separate host and operate on the image contents at the file level. The mapping of CO parameters to virtual part model objects is discussed in greater detail below. The price for the flexibility afforded by an IaaS approach to cloud computing is that beyond a limited set of dynamic protocols, such as DHCP, the configuration of the image contents is the responsibility of the user. For local COs, IaaS clouds typically support the passing of opaque user data from the deployer to the virtual image 202 to enable deploy time customizations.

The domain expert can embed a configuration operation engine in the virtual image that will evaluate the data passed by the deployer (See, for example, L. He, S. Smith, R. Willenborg, and Q. Wang. Automating deployment and activation of virtual images. Technical Report 0708, IBM WebSphere Journal, 2007, which is hereby incorporated by reference in its entirety). The user data includes an environment document with property section values, and may include COs that are not already present on the image. Local execution of COs greatly simplifies the process of image customization, and is used in at least one embodiment of the present invention. In contrast, the execution of remote and off-line COs requires the availability of a workflow engine, and a set of management hosts.

Virtual Solution Modeling

A virtual solution model (VSM) is used to capture the composition of one or more virtual part models 204 and the logical configuration of their deployment environment. The VSM is logical in the sense that the virtual part models 204 can potentially be realized by virtual images 202 stored in different repositories or clouds. Moreover, the environment is defined using high-level concepts such as placement zones, network zones, and storage volumes. The logical environment concepts and the virtual solution model are cloud-independent and admit realization in more than one kind of infrastructure cloud. The following is a discussion on how the virtual part models 204 are composed along with examples of logical cloud environment models. In one embodiment, the virtual part models 204 are composed using the VSIE 108.

With respect to virtual part composition, consider the creation of a logical topology for deploying a Sun J2EE enterprise application which utilizes directory authentication. The application artifacts include the application EAR archive, and an LDAP Data Interchange Format (LDIF) file to populate the directory server with application-specific schemas and users. Deployment of this application will therefore require a J2EE application server and an LDAP directory server. The following example is based on the virtual part models discussed above with respect to FIG. 3. To develop a more interesting solution example, the following two types of WAS servers are represented: an application server node, and a deployment manager node, which can federate any number of nodes into a cell which can host an application cluster. In addition, a port for HTTP connectivity is modeled and an "external" resource is represented that is independently deployed and associated with a read-only VPort model to represent an HTTP client accessing the cloud.

Figure 4:
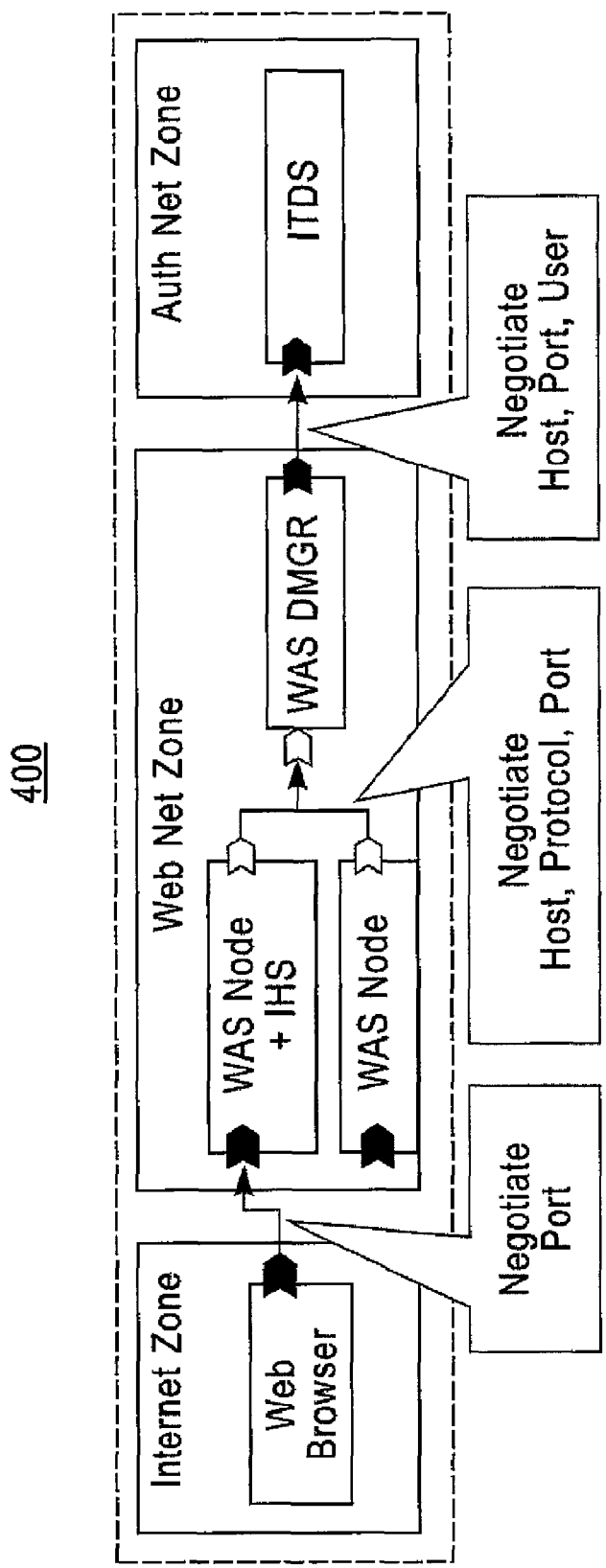

An example of a VSM 400 is illustrated in FIG. 4. In this topology the HTTP Client VPort has been connected to the HTTP Service VPort of a WAS Node which is configured to spray requests over the cluster it participates in. The cluster is configured via its Federate Client VPort connectivity to the deployment manager. Finally, the deployment manager is connected through its LDAP Client VPort to the ITDS Service VPort.

There are multiple ways in which such a logical topology can be constructed. A user may utilize a diagramming editor packaged as an application or a Web 2.0 service. The editor (e.g., the VSIE 108) can support the addition of virtual part models, and their graphical composition using linking or error resolution gestures. Alternatively, the topology can be created through a wizard interaction in which a user is queried about the types of parts to be added, with possible links created by user input or auto-suggested during wizard interaction with the user. Finally, such a topology can be created manually by editing the low level XML (or other similar language) representation.

Independent of the manner in which the topology is constructed, a key underlying mechanism of composition is VPort negotiation. When two VPorts are linked, they need to negotiate a consistent configuration. VPorts are designed to encapsulate all properties needed to effect configuration. Therefore, the negotiation can be localized to the two endpoints. When configuring communication, users often think of clients adjusting to the configuration of the server. Especially for new deployments, client configuration constraints may actually be more restrictive. For example, in the topology of FIG. 4, the HTTP connection between the web browser and the J2EE server will negotiate the TCP port value. If the client has been fixed to port 80, then the selected server configuration must match, or be changeable.

Negotiation may not settle on a specific configuration value, but only on the fact that it will be a shared value provided at deploy time. For example, depending on the cloud infrastructure, the host name may be user selectable or may be chosen by the cloud. In either case, at the time of negotiation the value will not be known. Instead, the negotiation focuses on checking that any known constraints are satisfiable. Constraint satisfiability is a difficult problem even when the language for expressing constraints is highly restricted (See for example, E. Tsang. Foundations of Constraint Satisfaction. Academic Press—Harcourt Brace & Company, 1993, which is hereby incorporated by reference in its entirety.) In such cases negotiation may either defer to the runtime, or ask the user for a representative sample to test.

With respect to Environment Specification, the functions and services of IaaS clouds are still far from standardized. Due to the similarity of function, however, there are some common configuration abstractions that can be generalized. For example, clouds often support constraining deployment to specific geographical regions, or segment their data centers into independent availability zones to support highly available deployments. IaaS clouds will also typically allow users to constrain the protocols and ports which are exposed in their deployed images. Next, three core cloud abstractions that can be used to logically model cloud deployments according to one or more embodiments of the present invention.

A model of a Placement Zone can be defined that can group any number of image models. The placement zone can be constrained to be realized in one or more geopolitical regions such as continents, political and trade associations, countries, states, and so on. A zone may be further constrained to identify the level of sharing that the customer is permitting whether it is at the data-center level, the rack/switch level, or the physical machine level. Constraint relationships can be established between zones to establish anti-collocation properties. Two zones may be constrained to be realized in different cloud providers, in different availability zones within the same provider, or across geopolitical zones in the same or different clouds.

The links between VPorts represent communication constraints that are to be satisfied by the cloud network infrastructure. These communication constraints are complemented with a model of a Network Zone that can group any number of virtual parts. Zones enable designers to express additional communication constraints that will apply to multiple images. For example, they can be used to open communication paths that may not have been explicitly modeled using VPorts. Moreover, network zones can be used to relax communication constraints between member images. At deploy time, network zones may be realized by zones already defined in the infrastructure. The realization of network zones may require the creation of multiple zones in the cloud if functions such as intra-zone communication constraints are not supported.

A logical model of Storage Volume can be linked to any number of images. The storage volume can be a member of a placement zone. Its realization can be constrained in terms of the level of sharing of physical storage with other customers, the use and level of encryption, its physical mapping properties (e.g. whether its bootable), and its I/O performance characteristics. Users can associate an artifact to populate the device, such as an ISO file. VSMs must be validated for internal consistency to detect link endpoint type mismatches, inconsistent VPort and product section values, constraint violations, and contradictory environment requirements. In one prototype created according to one or more embodiments of the present invention, the deployment validation framework contributed to RSA 7.5 by the inventors was used to register domain validation logic, and report errors to the users (See, for example, T. Eilam, M. Kalantar, A. Konstantinou, G. Pacifici, J. Pershing, and A. Agrawal. Managing the configuration complexity of distributed applications in internet data centers. IEEE Communication Magazine, 44(3): 166{177, 2006, which is hereby incorporated by reference in its entirety).

Solution Deployment Modeling

The VSM 400 discussed above determines the composition of virtual parts at the interface level and comprises their deployment environment in a platform-independent manner. In order to enable deployment of the virtual solution, the virtual part interfaces are to be bound to specific implementations and the platform independent environment models are to be realized by cloud specific configuration models. This transformation is performed by a user, such as a deployment architect, using the VSIE 108 and its result is a virtual solution deployment model (VSDM). The deployment model is platform specific and can be used to generate a parameterized deployment plan to provision it in one or more clouds, as will be outlined in the next section.

Figure 5:
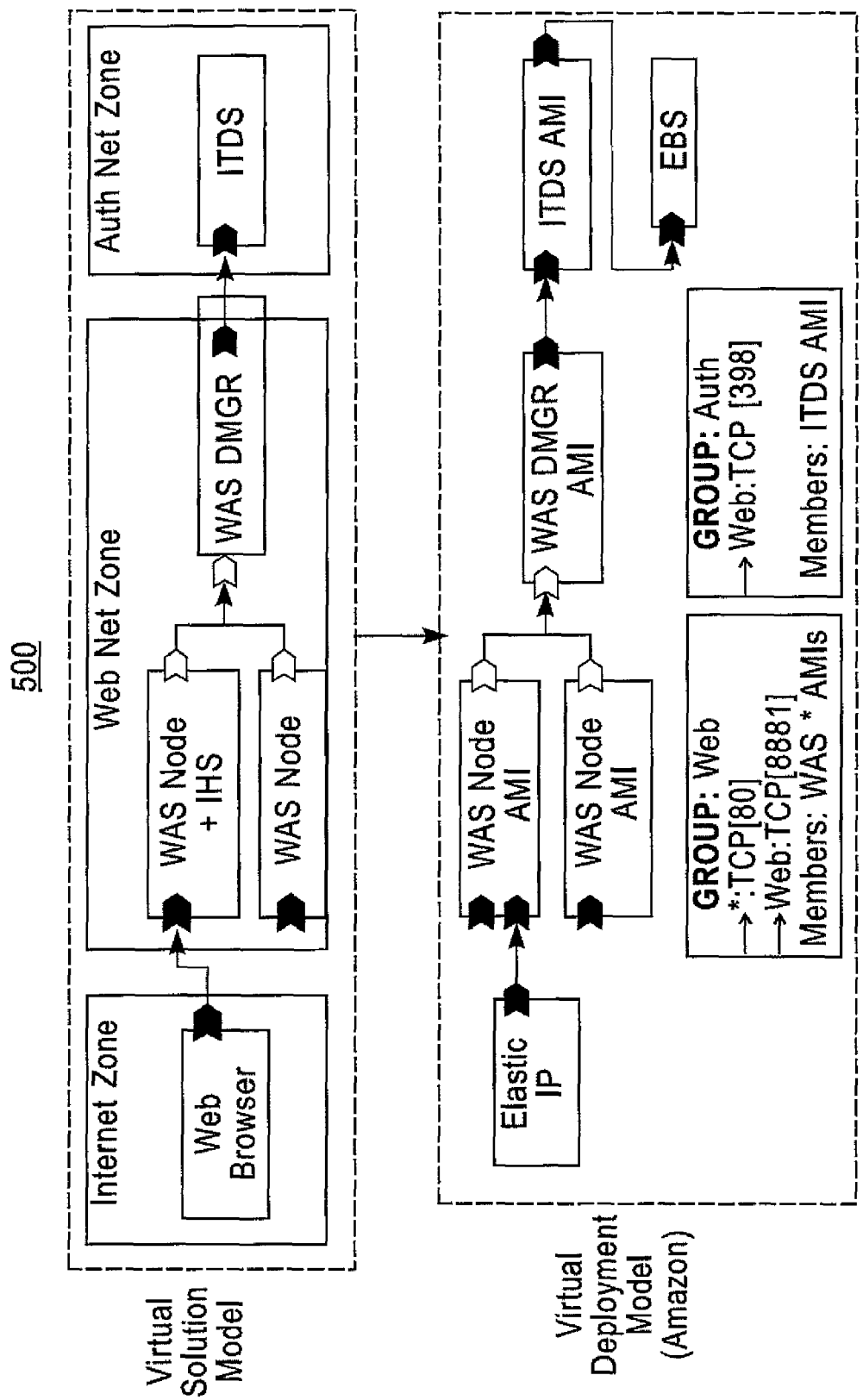
FIG. 5 shows an example of a deployment model for deploying virtual parts, according to one embodiment of the present invention.

In selecting one or more clouds to deploy a virtual solution, the deployment architect considers the availability of virtual part implementations and the capabilities of the clouds selected to implement the environment constraints. If the images are available in an external asset repository, then the deployer will typically upload and register them with the cloud. If the format and content of the images is not directly compatible with the cloud then a domain expert may be involved to resolve compatibility issues. This discussion gives an example of deploying virtual parts where matching images can be found in the targeted cloud. However, the various embodiments of the present invention are not limited to this example. Consider the transformation of the virtual solution model discussed above for deployment on the Amazon Elastic Compute Cloud (EC2) (See, for example, Amazon EC2 [(http://aws.amazon.com/ec2/)], which is hereby incorporated by reference in its entirety). The first step 500 of the transformation, which is depicted in FIG. 5, involves identifying the Amazon Machine Image (AMIs) for each of the three types of virtual parts in the solution.

The part models for the AMIs may extend the solution virtual part models with additional configuration properties and VPorts that are Amazon EC2-specific. For example, an AMI instance can be linked to an Amazon EC2 Elastic Block Storage volume for device level access to storage. Similarly, an AMI instance can be associated with an Elastic IP to maintain a static address that can be reassigned in case of failure. Domain-specific validation rules will also apply, such as that an AMI instance must be on the same availability zone as its EBS volumes. Finally, the mapping of a part interface may be more complex if its implementation involves additional resources such as a block storage device for persistent storage. Depending on the implementation, a new block storage device may need to be allocated and configured for mounting, or an existing one may need to be cloned and mounted. FIG. 5 illustrates an example of how the ITDS part model can be realized by an AMI configured to mount a new storage volume.

The second step of the transformation is to realize the virtual solution environment constraints in the target cloud infrastructure. In the case of Amazon EC2, network isolation zones are modeled as security groups that are associated with AMI instances and configured with IP permission rules. The rules open specific protocol port ranges and can apply to specific IP addresses, IP subnets, or members of a security group. The default policy is to deny all traffic from outside or inside the zone. The transformation of the virtual solution model's communication constraints and network zones into Amazon EC2 availability zones can be assisted by tooling as discussed in T. Eilam, M. Kalantar, A. Konstantinou, and G. Pacifici, Reducing The Complexity Of Application Deployment In Large Data Centers, in IM, 2005, which is hereby incorporated by reference in its entirety. For each network zone a security group is created. The VPort connectivity at the virtual solution model level implies network connectivity requirements.

Each VPort configuration link is to be transformed into its corresponding network layer connections. For example, as shown in FIG. 5, the WAS Nodes are configured to be federated by the WAS Deployment Manager using the JMX protocol over TCP port 8881. As all three image instances will be in the same zone (Web) an IP permission rule can be defined to allow intrazone TCP communication on port 8881. Similarly, the Web security group can be configured to expose TCP port 80 for Internet traffic, and the Auth security group to expose TCP port 398 for LDAP traffic from the Web group.

From a functional perspective, there may be multiple realizations of a virtual solution into a set of clouds. In such cases, deployment architects may consider non-functional measures such as cost, time to deploy, latency, scalability, and availability. A detailed discussion of algorithms for availability and performance analysis may be found in the following reference: L. Xie, J. Luo, J. Qiu, J. A. Pershing, Y. Li, and Y. Chen. Availability weak point analysis over a SOA deployment framework, in NOMS. IEEE, 2008, which is hereby incorporated by reference in its entirety. The inventors believe that an example of the presently discussed model-driven transformation approach could be applied to high-availability pattern analysis using methods and algorithms such as discussed in the aforementioned reference. Specific mechanisms for a deployment model transformation approach based on a search through a set of pattern-based transformations is provided in the following references: T. Eilam, M. Kalantar, A. Konstantinou, and G. Pacifici, Reducing The Complexity Of Application Deployment In Large Data Centers, in IM, 2005; and T. Eilam, M. Kalantar, A. Konstantinou, G. Pacifici, J. Pershing, and A. Agrawal, Managing The Configuration Complexity Of Distributed Applications In Internet Data Centers, in IEEE Communication Magazine, 44(3):166-177, 2006; which are hereby collectively incorporated by reference in their entireties.

Solution Deployment Planning

Figure 6:
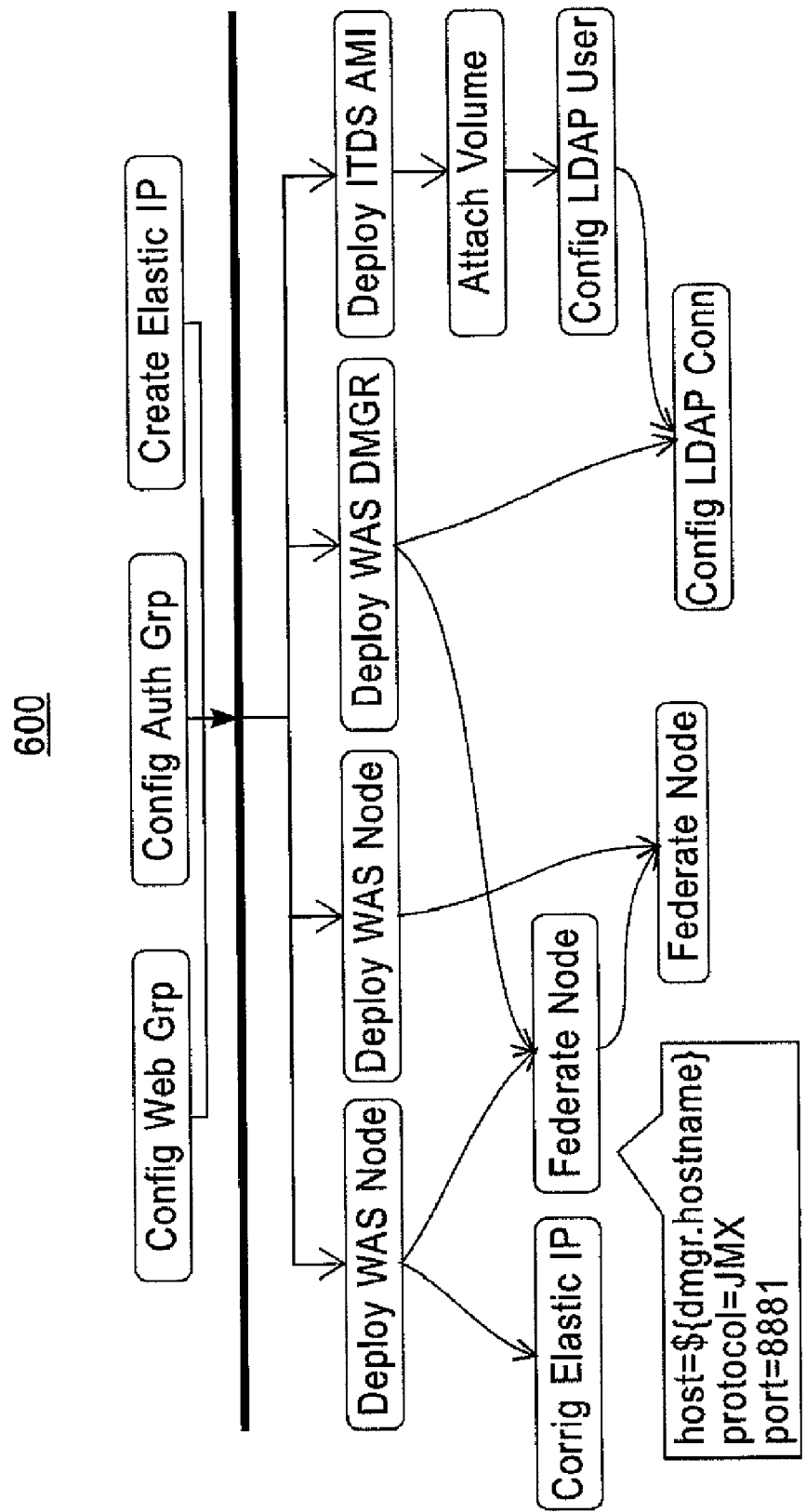
FIG. 6 shows a plan for the deployment model of FIG. 5.

Once the Virtual Solution Deployment Model has been finalized the deployment architect, via the VSIE 108, generates a plan to provision the VSDM in the cloud. The deployment plan 600, such as the example shown in FIG. 6, is a partial order of cloud and image configuration operations. When local image configuration operations are used, the execution of the plan will occur at two levels. The top execution level invokes the cloud APIs to configure the environment (e.g. create security groups), and to deploy the images. The deployment of each image 202 is parameterized by user data containing an environment document with parameter values, such as the root user password, and any configuration operations that are not present in the image 202. The second level of execution occurs inside the image 202 at the time it is started when the configuration operation engine within the VSIE manager 112 invokes the operations specified in the environment document.

There are two challenges to generating such a deployment plan. The first challenge is to identify the operations which will "cover" the deployment model, and map their parameters to deployment model object attributes. The second challenge is to identify the temporal dependencies between operations to determine the partial order of execution. Therefore, to overcome these challenges, an AI planning-based approach to deployment plan generation can be utilized in one embodiment such as that discussed in K. El Maghraoui, A. Meghranjani, T. Eilam, M. Kalantar, and A. Konstantinou, Model Driven Provisioning Bridging The Gap Between Declarative Object Models And Procedural Provisioning Tools, in *Middleware*, volume 4290 of *LNCS*, Springer, 2006, which is hereby incorporated by reference in its entirety. The general AI planning approach is typically used where the transition from initial to goal state involves creation of transient configurations. Due to the simpler nature of the deployment models associated with virtual solutions, it is possible to apply more restricted planners for a gain in performance and reduced algorithm complexity.

The simplified planning approach in one or more embodiments of the present invention is based on deployment patterns as discussed in W. Arnold, T. Eilam, M. Kalantar, A. Konstantinou, and A. Totok, Pattern Based SOA Deployment, in *ICSOC*, volume 4749 of *LNCS*, Springer, 2007, which is hereby incorporated by reference in its entirety. The mapping of a configuration operation against a conceptual model of the objects which it configures is captured, including the propagation of attributes from the model to the operation. The realizations of configuration operation patterns on the VSDM topology are searched through to find a complete covering of all of the objects that are to be provisioned. The realization mapping identifies the operation and the relation of its parameters to the model attributes. Examples of operation patterns can be (but are not limited to) image instantiation, security group creation, elastic IP creation, and the like. To determine the order of the operations, VPorts are associated with a constraint indicating that their linkage implies a deployment order dependency.

The deployment model ordering constraints are then projected on the operation model that has been created. FIG. 6 shows a plan 600 for the deployment model 500 of FIG. 5. Based on the VPort link constraints, the plan 600 specifies that the groups and elastic IPs have to be configured before the AMIs are instantiated. The images can be deployed in parallel; however, the configuration of the VPorts is associated with temporal constraints (not shown in the figure). One constraint is that the deployment manager can only federate one node at a time. For WAS security to be enforced, the ITDS server needs to be up and configured with the WAS admin user entry. Finally, the Elastic IP can only be assigned to the WAS Node AMI after it has been deployed. Every operation has parameters that are bound to constants or to values from the model. For example, the operation to federate a WAS node is assigned the specific host name at deploy time, whereas the protocol type and port are fixed because the VPort does not expose them as a parameter.

VSIE for Virtual Solution Composition and Deployment

The following discussion gives various examples of using the VSIE 108 for virtual solution composition and deployment. As discussed above, a user is able to create virtual parts 116 utilizing the VSIE 108. In one embodiment, the VSIE 108 presents the user with a workspace for creating a virtual part 116. When creating a virtual part 116 the user first creates a base virtual image 202 (e.g., VMWARE or XEN image) or selects a predefined virtual image 202 from a palette displayed within the VSIE 108. The user then installs the desired software and performs codification of configuration scripts needed to configure the image software stack (SS) as part of composition or as part of deployment.

The scripts are then stored in a directory in the image 202. The part model 204 discussed above is then defined by the user. For example, the user defines the (a) virtual part internal model and (b) exposed configurability points. The internal model of the virtual part is a data model (e.g., based on the XML Schema Language or similar language) that represent at some level of abstraction the structure/configuration of the image (e.g., some elements in the SS) and comprises the data that is needed by the configuration scripts, and the validation/resolution rules (see hereafter). The internal model, in one embodiment, can be a very detailed model that comprises the exact configuration of the image, and in another embodiment can be a flat list of properties and/or completely identical to the model exposed through the exposed configurability points.

The exposed configurability points define what can be seen and potentially set by the user at composition time. The exposed configurability points, if any, may comprise a set of (optionally) settable properties (such as level of security in WebSphere), and also (optionally) a set of "ports" (VPorts discussed above) that define what other virtual parts 116 this part requires, or can be optionally made to work with. Each such VPort comprises information about corresponding properties that need to be set up with values in order to "realize" the connection/composition decisions, and logic to determine what are the valid options. The structure of the exposed configurability points may be more complicated than a simple flat list of properties and ports. In particular, some of the configuration structure and the relationship between properties may be exposed. In the most general form, what is exposed is an "external" model that comprises nodes, attributes, and relationships, where the user can set/change some values or relationships, but others may be fixed. The mapping of the "exposed" model, and the "internal" model (if it exists) is the responsibility of the virtual part 116. Thus, the virtual part 116 creator defines this mapping, and this can be done either declaratively via model-to-model mapping tool, or imperatively using any programming language.

A virtual part creation design rule advocates to expose in the "external" model just enough for the users in the composition and deployment stages to be able to configure and instantiate the part correctly, and in correspondence to the intention of the part creator.

Another virtual part creation design rule advocates finding the right tradeoff between finer grain "internal" models (which frequently go together with better reusability of the internal logic in the virtual part across parts of the same family and easier evolution of the part) and coarse grained "internal" models (which frequently mean that the part is less complex to author).

In both the internal/external models, model elements can be annotated to be in various life cycle states. The desired state may also be indicated. One can be further defined whether this is desired state for packaging or deployment. For example, an internal model may comprise a model configuration element of type DATASOURCE, that is in state "uninstalled" and the desired packaging state is "installed". This means that the intention is that the data source will be created as part of the packaging of the image as it is not part of the image at present. Note, that this information is likely to be internal and not exposed to the user at composition time. It is also possible that such modeling element is not present in the internal model, but yet, at packaging a data source will be created, and that is because the knowledge is implied in one of the configuration operations (see below) that are part of the virtual part design and is associated with an external property.

With respect to validation and resolution rules, validation rules can be seen as constraints evaluated on the model (this could be either internal or external model) and generate errors, if not satisfied. (For example, "all host names must be unique"). Errors may or may not be exposed to users at solution composition phase. Errors can be handled automatically by the platform and the internal part logic. Validation rules can be defined declaratively using a constraint language such as OCL, and/or imperatively using any programming language. The virtual part author, in one embodiment, has the responsibility to define validation rules that operate on the internal/external models of the virtual part 116. It should be noted that a virtual part 116 can comprise zero validation rules. Resolution rules are pieces of logic that transform the model and are associated with one or more error types. Resolution rules can be marked for automatic execution, and/or associated with pre-conditions for automatic execution. Resolution rules can be defined declarative, or imperatively using any programming language.

With respect to configuration operations (e.g. scripts), operations are associated with internal or external modeling element, where the mapping can be many-to-many. The mapping defines the relationship between operation input parameters and model elements (such as attribute values). The mapping may be further annotated to indicate the type of affect that the operation execution has. For example, a configuration operation may be annotated to indicate that it has an effect of creating a data source, or deleting a data source, or setting or changing an attribute value. The virtual part creator, in one embodiment, has the responsibility to define or code configuration operations, and to create the meta data describe the operation including describing the affect by mapping to modeling elements (types or instances), describing the mapping between the models and the parameters, or including in the operation a different way to infer the values of the inputs of the state of the part.

Once virtual parts 116 have been created, virtual solution composition and packaging can occur. This phase of the virtual solution life cycle includes two steps: solution definition and solution packaging. In the solution definition step, an expert, a solution provider, or an end-customer, graphically define a distributed solution based on the set of Virtual Parts. The user such as a solution architect provides input through well defined customization points of each part. This includes selection of parts, connecting parts through connectivity ports (defined in the virtual part 116 composition process), and assigning values to part's exposed properties.

Figure 7:
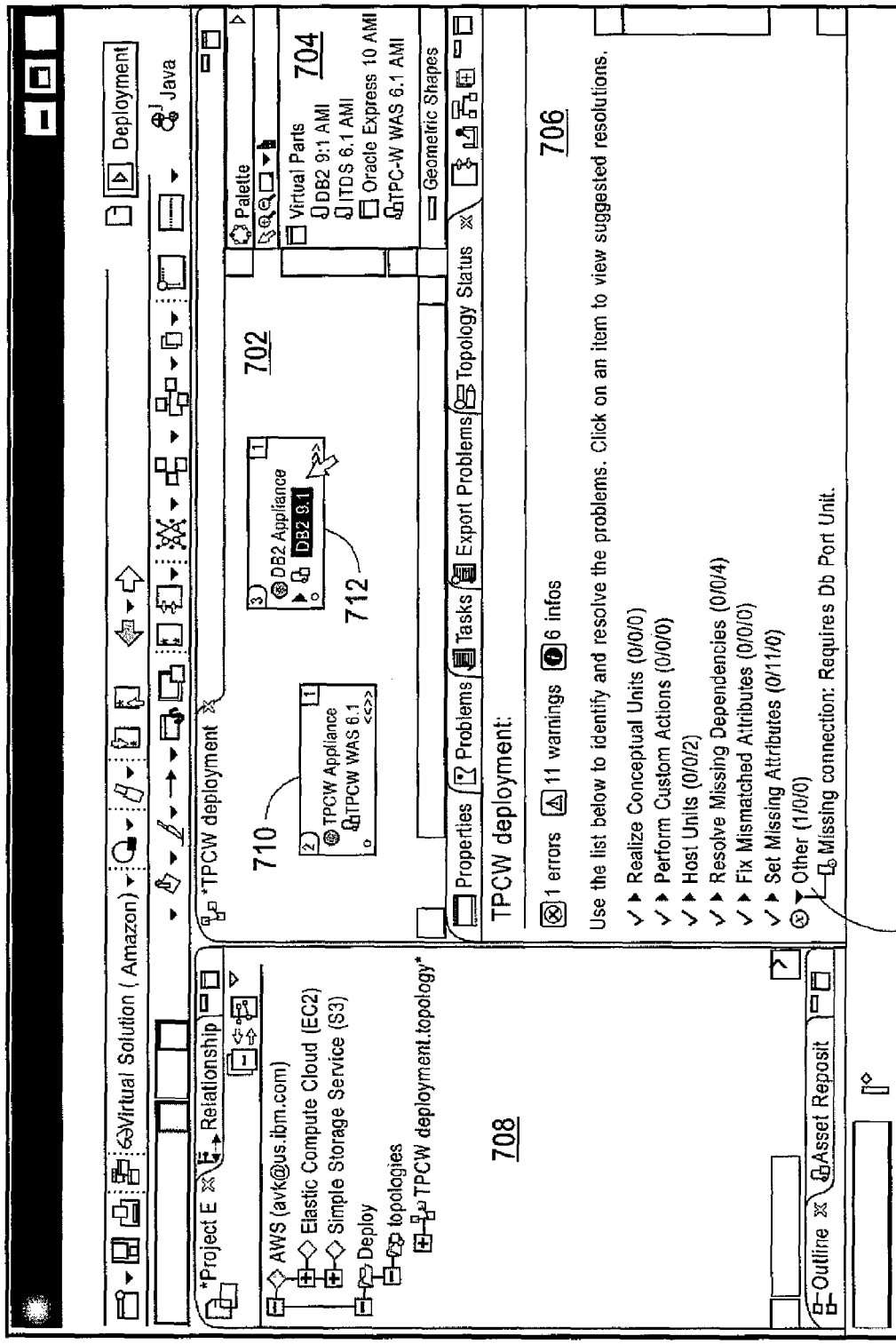
FIGS. 7 and 8 illustrate one example of a virtual solution interactive environment, according to one embodiment of the present invention.
Figure 8:
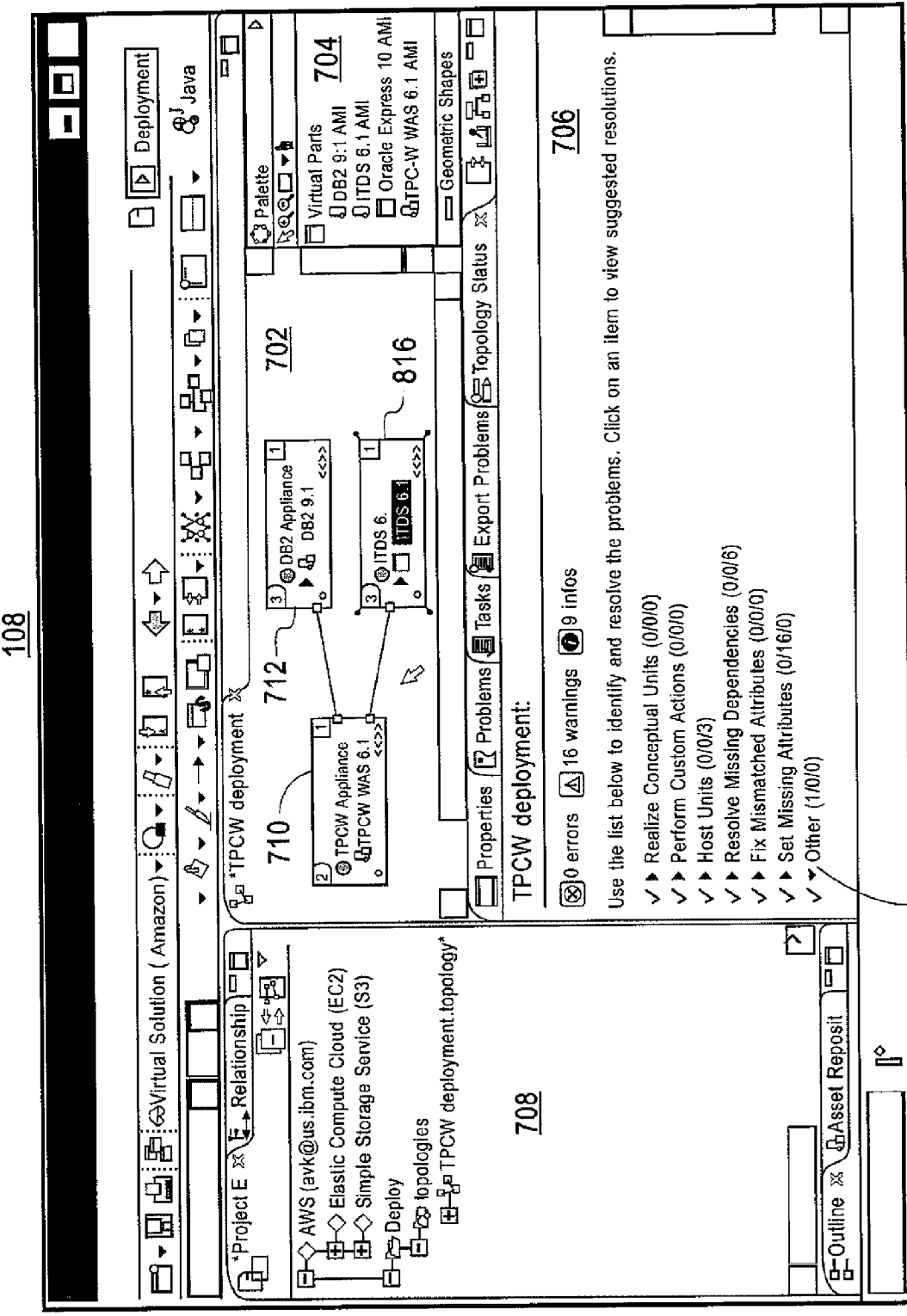

For example, FIG. 7 shows the VSIE 108 comprising a workspace 702, a palette 704, a notification area 706, and other areas 708. The workspace area 702 allows a user to "drag and drop" virtual parts 116 from the palette 704. The palette 704 can be populate with a plurality of virtual parts 116 that a user can utilize to compose a virtual solution. FIG. 7 shows that a user has populated the workspace 702 with two virtual parts 710, 712. The notification area 706 displays information to the user such as (but not limited to) errors, warnings, and other information. For example, because the user has not connected the virtual parts 116 an error message 714 is displayed indicating to the user that a missing connection that requires a Db port unit is required. As can be seen in FIG. 8, the user has connected the first virtual part 710 with a second virtual part 712 thereby satisfying the error message 714. FIG. 7 also shows that the user has connected the first virtual part 710 with a third virtual part 816 as well.

In one embodiment, if the user populates the workspace 702 with a virtual part 710, the VSIE manager 112 can automatically indicate to the user which of the virtual parts within the palette 704 are compatible with the virtual part 710 in the workspace. This indication can be performed using any visual indication mechanisms. Alternatively, the VSIE manager 112 can repopulate the palette with compatible virtual parts. In yet another embodiment, if the workspace 702 comprises a plurality of virtual parts that are unconnected, the VSIE manager 112 can highlight compatible virtual parts when one or more virtual parts within the workspace 702 are selected.

The example of FIG. 8 comprises a domain that captures the different types of VPort models discussed above. The VPort types of FIG. 8 are associated with negotiation policies which can be customized at the instance level and are contributed in the form of validations and resolutions. When two VPorts are graphically linked, a negotiation engine within the VSIE 112 uses these validation and resolution rules to broker a configuration that is valid for both endpoints.

The example of FIG. 8 uses four virtual parts: (1) a WAS application server part to host the TPC-W benchmark J2EE application, (2) an IBM DB2 database part, (3) an Oracle Express database part, and (4) an IBM ITDS directory part. The TPC-W virtual part requires database connectivity in the form of an out VPort and supports custom DDLs for either DB2 or Oracle. Neither the DB2 nor the Oracle part has any knowledge of the TPC-W part. In this example, solution architects can connect the TPC-W part to either DB2 or Oracle, resulting in appropriate bindings being generated on both endpoints. The TPC-W part can also optionally be connected to the ITDS directory server. The connection captures the passing of the LDIF information to create the appropriate users on the LDAP server at deploy time.

FIG. 8 shows how a solution architect can assemble a virtual solution model by adding virtual part models and simply linking their VPorts. For example, for a topology with TPC-W+DB2+ITDS, this can be achieved in just five simple user gestures. All the negotiations over port parameters are performed automatically as part of the linking gesture. A user, such as a deployment architect, can realize the virtual parts with existing images, and add additional specific configurations, such as security groups and Elastic IPs, by providing user input such as dragging and dropping from the palette 704, and using link gestures to the virtual parts.

Once the user defines the solution by making choices through well-defined configurability points (e.g., ports) the VSIE manager 112 generates the required configuration logic to be executed by a packaging manager module of the VSIE manager 112. The user also defines software stack deployment points of variability (e.g., DB2 password). In response, the VSIE manager 112 generates required configuration logic to be executed at deployment. For example, a deployer can start a simple wizard to deploy an instance of the solution by supplying parameters such as the Amazon machine type (most parameters are associated with valid default values). When the wizard completes, the VSIE 112 generates the activation profiles to be passed as user data at image deployment, and invokes the Amazon SOAP API operations identified by the planner in the right order. Any physical deployment requirements e.g., hypervisor type, security/isolation defined by the user are to be consumed by a deployment manager module of the VSIE manager 112. The solution composition process discussed above provides feedback to the user (such as the error message 714 discussed above), but the actual images are not yet affected.

With respect to the packaging step of the virtual solution composition and packaging process, a new set of images are created, that includes additional configuration of the involved base (part) images, to support choices made at composition. This packaging process, in one embodiment, is an automatic process that makes changes to images based on the solution definition discussed above. The result set of images are configured to work together and form the physical manifestation of the solution defined. The VSIE manager 112 affects changes to support user choices such as software connectivity and embeds new logic in images necessary to support new deployment PoVs. The packaging process of the VSIE manager 112 results in a new set of images that are any of: (1) pre-configured based on user choices, (2) embedded logic to support deployment PoVs, and (3) meta data to describe inputs and deployment requirements. As can be seen, there are many operations performed transparently by the VSIE manager 112, using the information in the parts 116, and common inference logic, to create configuration logic (plan) for packaging, and downstream deployment, to support the intention of the architect who defines the solution. The packaging activity may or may not include collecting values of parameters and executing COs and capturing a new pre-configured sets of images. Users may decide to defer all parameter collection and CO execution to deployment time, where the COs are executed on the original images associated with the selected Virtual Parts. In this case, packaging may involve selected virtual parts, selected links between virtual parts, and storing the Virtual Solution Model, and/or the Virtual Solution Deployment Model, consisting of the specification/selection of virtual parts, and the linking, and maybe partial values for some of the deployment parameters.

When the virtual solution has been packaged, the virtual solution can automatically be deployed in a data center. Based on deployment requirements solution components are mapped to suitable virtual resources (hypervisors). Inputs, corresponding to the deployment points of variability are collected, and the deployment configuration plan is executed to affect changes in software stack. Deployment requirements on the environment, packaged together with the solution description can be processed by a deployment manager module of the VSIE manager 112 to affect changes on the environment such as network configuration for security.

EXAMPLE OPERATIONAL FLOW DIAGRAMS

Figure 9:
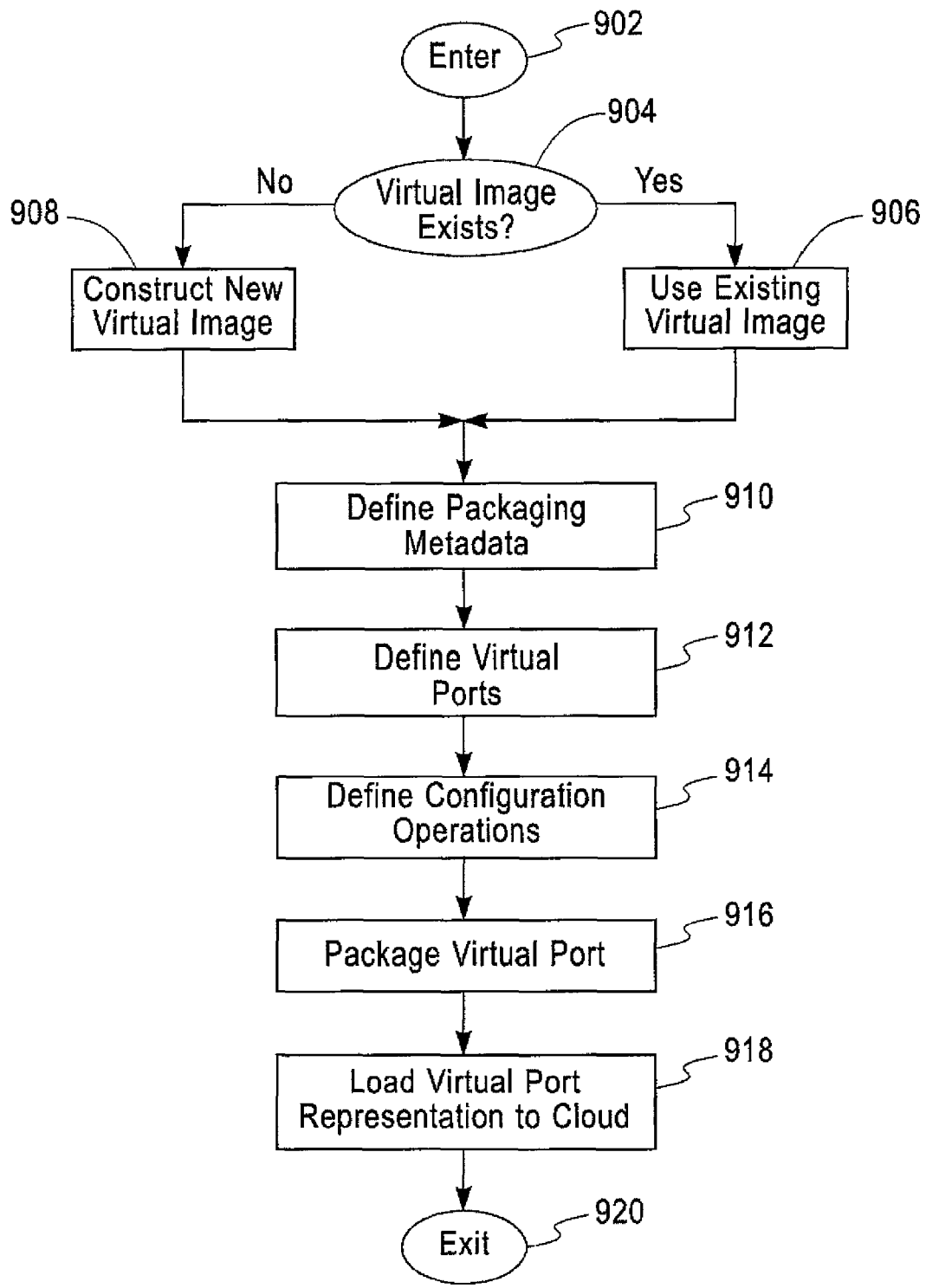
FIGS. 9, 10, and 11, illustrate various example operational flow diagrams associated with composing and deploying virtual parts in a virtual solution computing system.
Figure 10:
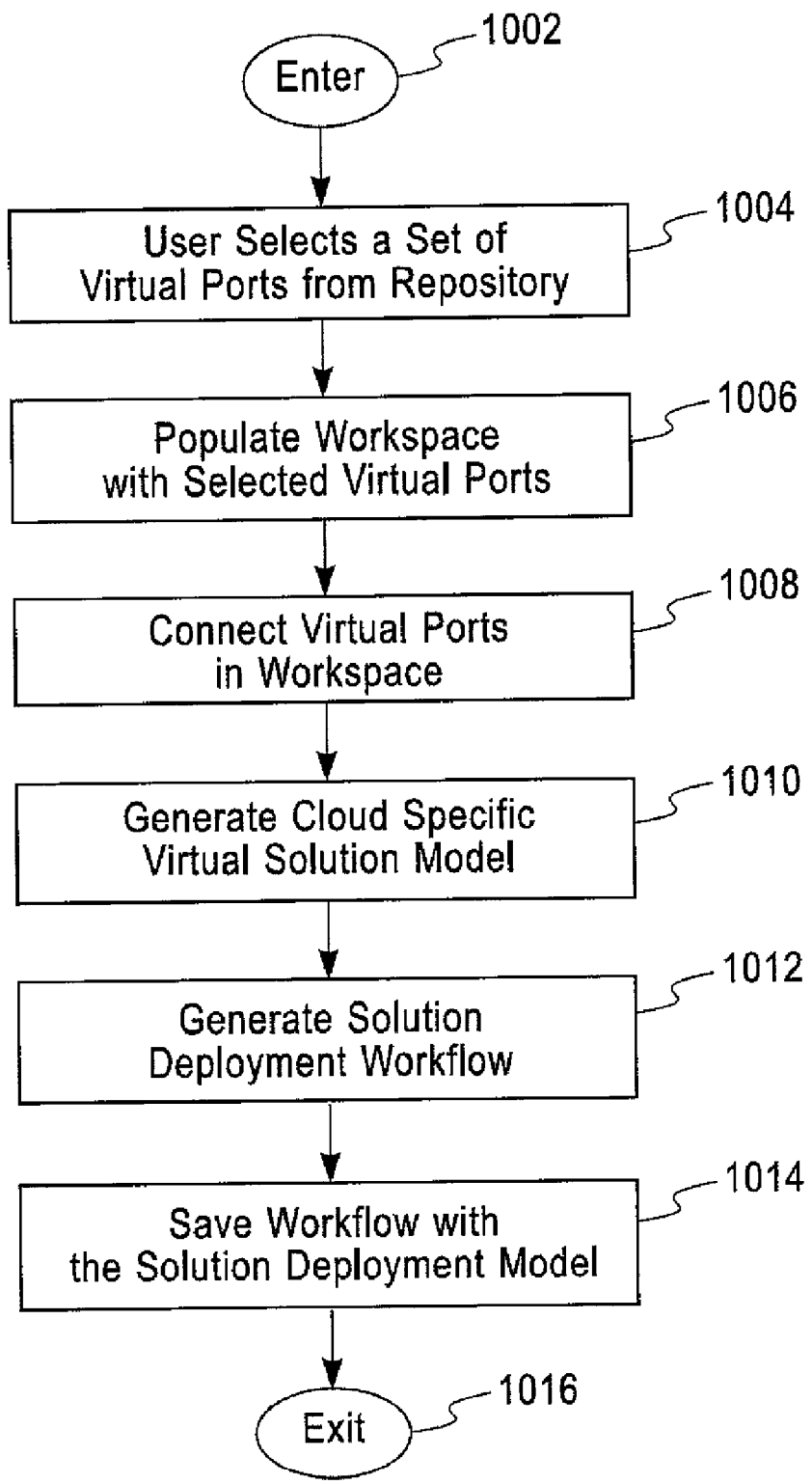
Figure 11:
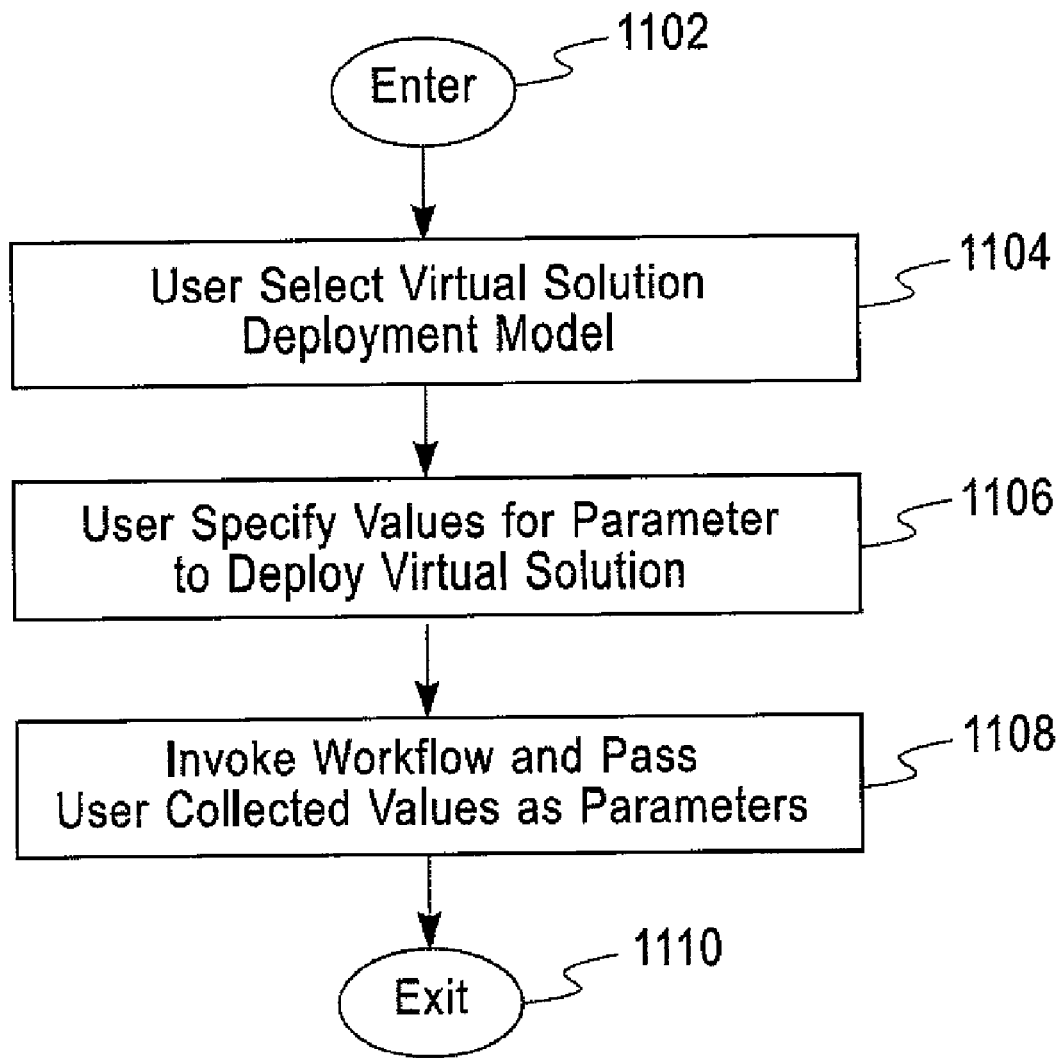

FIGS. 9, 10, and 11, illustrate various operational flow diagrams associated with virtual parts construction, solution composing, and solution deployment, in a virtual solution computing system.

FIG. 9 is an operational flow diagram illustrating one process for composing a virtual part 116. The operational flow diagram of FIG. 9 begins at step 902 and flows directly into step 904.

If a virtual image does not exist, at step 904, the user constructs a virtual image as normal, at step 908. For example, the user can start a VM and install software and then captures the new virtual image. Alternatively, if a virtual image does exist, at step 904, then use it, at step 908, in composing a virtual part 116.

In the graphical tool, at step 910, the user defines "packaging" meta data. For example, the meta data can include a list of "product sections" grouping deployment parameters such as host name, user name, etc.

Deployment parameters may be marked as "mandatory" or "optional". Additional meta data may be defined. For example, some deployment parameters are collectable from the user, while others are obtained from the environment (for example, IP addresses may be selected by the cloud management).

In the graphical tool, at step 912, the user provides user input, such as typing at a keyboard, making cursor movements and selections using a mouse, a stylus or other user input device, to define "virtual ports" representing cross image composition choices. For example, the user may define that a WebSphere virtual part may optionally be connected to a LDAP server. To define a "virtual port", in this example, the user defines the type of end point—multiple end points can be defined with AND/OR relationships. The user defines required properties that need to be obtained from the endpoint—such as for example the LDAP host name and credentials. The user defines constraints on values (e.g., range constraints). The user defines properties of this virtual part 116 that can be made available to the other endpoint. The user can also define propagation relationships to/from deployment parameters in product sections.

Optionally, the user defines a negotiation policy for determining values automatically. For example, if two virtual parts declare a range constraint on the value of a property required by both, a MIN policy may select the minimum value within the intersecting range.

At step 914, the user provides user input to define configuration operations (COs). For example, a CO may comprise a script that is stored internally or externally to the virtual image and is executed as part of activating the virtual image. The user defines meta data describing each CO, including, any of the following: 1) input parameters of CO linked to the properties of the product section, 2) meta data describing where the script is stored and where it is executed, 3) meta data describing temporal dependencies between different COs, 4) meta data describing linkage between COs and virtual ports—for example, some COs must run every time an image is instantiated, while others need to be executed only if a certain port is active.

At step 916, the tool packages the virtual part, optionally including generation of appropriate activation workflows. For example, if a CO is stored externally to the image, but must be executed in the guest, the activation workflow will include copying the script to the image and invoking it. The activation workflow typically will also include a step of obtaining values of the deployment parameters from the user and passing this data to the image. Additionally, using a topological sort algorithm or other planning algorithms the order between the COs, respecting declared temporal dependencies, is determined by the tool. Additionally, the tool configures the virtual image as packaged in the virtual part. For example, scripts that need to be stored in the image are copied to the virtual image (based on the CO meta data).

At step 918, the tool loads a virtual part representation to the cloud. The operational flow sequence then exits, at step 920.

FIG. 10 is an operational flow diagram illustrating one process for composing a virtual solution. The operational flow diagram of FIG. 10 begins at step 1002 and flows directly into step 1004.

The user, at step 1004, selects a set of virtual parts. The user can query an asset repository to get available virtual part descriptions. The user, at step 1006, populates a workspace that is available via a user interface of a solution composition tool, with the selected set of virtual parts.

At step 1008, the user provides user input to connect virtual parts with links in the workspace, such as by exercising the virtual ports of the parts in the workspace. Optionally, the user can also express other deployment requirements such as isolation zones, placement (collocation), and server characteristics (e.g., small|medium|large). The user can optionally save a virtual solution model represented in the workspace.

At step 1010, the user selects a target cloud, the user selects a target repository for images, and the tool generates a cloud-specific virtual solution deployment model.

In this regard, the tool offers choices to map conceptual deployment requirements to specific cloud concepts based on the chosen cloud. For each of the virtual parts the user selects a specific image to be used. The tool offers choices of images, maintained in an image repository, that satisfy the virtual part specification and are deployable in the target cloud.

At step 1012, the tool generates a parameterized solution deployment workflow based on the virtual solution deployment model. The algorithm followed by the tool, in one example, can include any of the following. First, the tool identifies necessary COs and ordering. For example, any CO linked to an active virtual port is necessary, and all other mandatory COs are necessary. Second, the tool uses a topological sort algorithm to order COs taking into account temporal dependencies. Third, the tool can inject other required actions such as copying a script to an image if the CO is stored externally but needs to be executed in the guest. The tool can also collect and make values of parameters available to the image.

At step 1014, the user can optionally review the workflow, edit the workflow, and save the workflow together with the virtual solution deployment model. The operational flow sequence then exits, at step 1016.

FIG. 11 is an operational flow diagram illustrating one process for deploying a virtual solution. The operational flow diagram of FIG. 11 begins at step 1102 and flows directly into step 1104.

The user, at step 1104, provides user input to select a Virtual Solution Deployment Model. At step 1106, the user specifies values for parameters based on meta data to deploy the virtual solution. A form may be presented to the user based on introspection of the meta data.

At step 1108, the tool invokes the workflow and passes the user collected values as parameters. The operational flow sequence then exits, at step 1110.

Information Processing System

Figure 12:
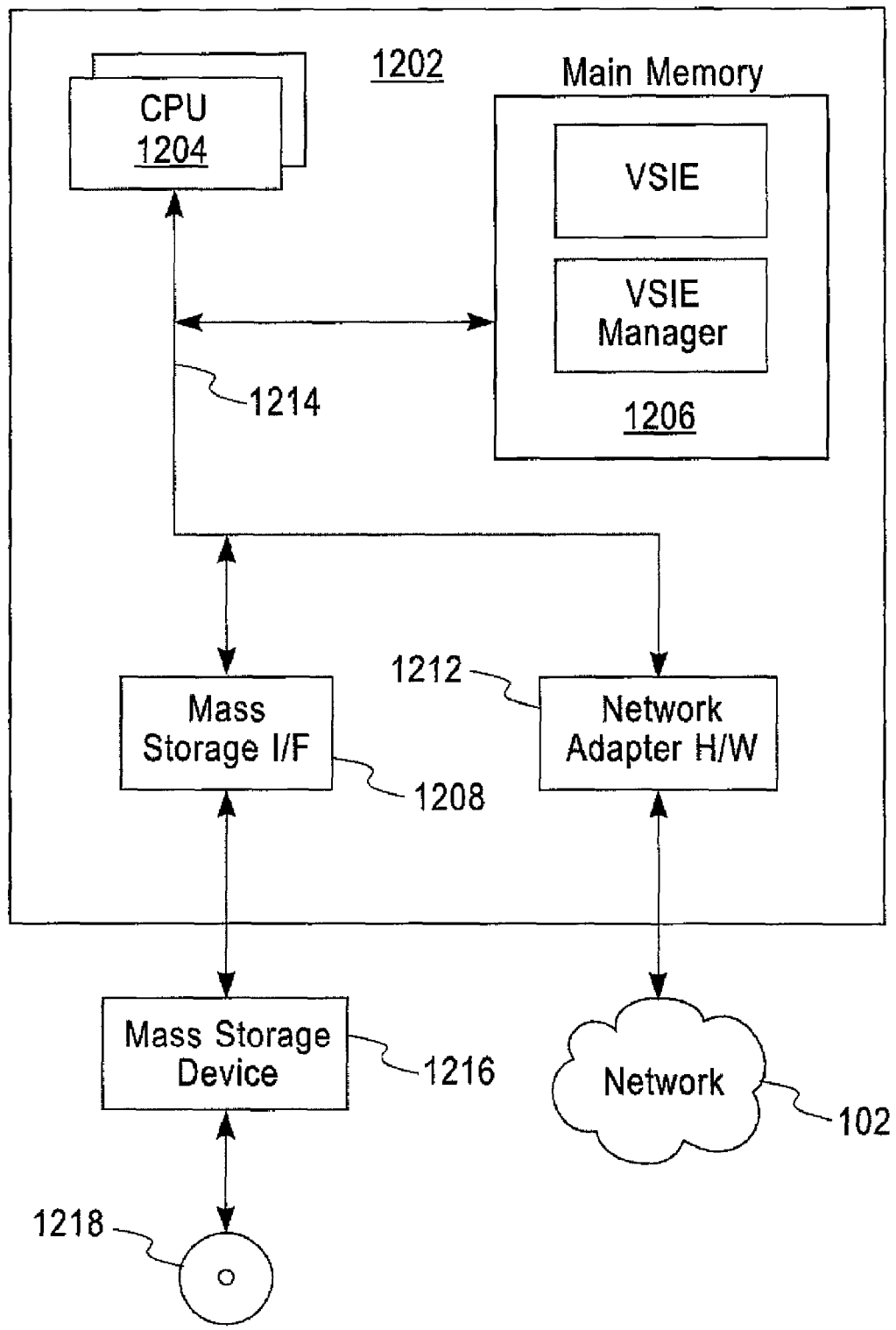
FIG. 12 is a block diagram illustrating a more detailed view of an information processing system that can be utilized in the operating environment of FIG. 1.

FIG. 12 is a block diagram illustrating a more detailed view of an information processing system 1200 that can be utilized in the operating environment 100 discussed above with respect to FIG. 1. The information processing system 1200 is based upon a suitably configured processing system adapted to implement the exemplary embodiment of the present invention. Similarly, any suitably configured processing system can be used as the information processing system 1200 by embodiments of the present invention.

The information processing system 1200 includes a computer 1202. The computer 1202 has a processor(s) 1204 that is connected to a main memory 1206, mass storage interface 1208, and network adapter hardware 1212. A system bus 1214 interconnects these system components. The main memory 1206, in one embodiment, includes the VSIE 108 and the VSIE manager 112.

Although illustrated as concurrently resident in the main memory 1206, it is clear that respective components of the main memory 1206 are not required to be completely resident in the main memory 1206 at all times or even at the same time. In one embodiment, the information processing system 1200 utilizes conventional virtual addressing mechanisms to allow programs to behave as if they have access to a large, single storage entity, referred to herein as a computer system memory, instead of access to multiple, smaller storage entities such as the main memory 1206 and data storage device 1216. Note that the term "computer system memory" is used herein to generically refer to the entire virtual memory of the information processing system 1206.

The mass storage interface 1208 is used to connect mass storage devices, such as data storage device 1216, to the information processing system 1200. One specific type of data storage device is an optical drive such as a CD/DVD drive, which may be used to store data to and read data from a computer readable medium or storage product such as (but not limited to) a CD/DVD 1218. Another type of data storage device is a data storage device configured to support, for example, NTFS type file system operations.

Although only one CPU 1204 is illustrated for computer 1202, computer systems with multiple CPUs can be used equally effectively. Embodiments of the present invention further incorporate interfaces that each includes separate, fully programmed microprocessors that are used to off-load processing from the CPU 1204. An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1200. The network adapter hardware 1212 is used to provide an interface to a network 102. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 618, CD ROM, or other form of recordable media, or via any type of electronic transmission mechanism.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer program product stored in a memory and executable by a processor, and comprising a virtual part for composing a virtual solution comprised of a plurality of virtual parts, the virtual part comprising:
   a virtual image comprising a set of software components, wherein each software component in the set of software components is compatible with each other;
   a set of configurability points, wherein each configurability point in the set of configurability points defines at least one parameter of at least one of the software components of the virtual image that is configurable during virtual solution composition, wherein virtual solution composition comprises associating at least a first virtual part to operate with at least a second virtual part;

a set of virtual ports, wherein each virtual port within the set of virtual ports indicates at least one of
  a set of virtual parts required by the virtual part comprising the set of virtual ports, and
  a set of virtual parts that are compatible with the virtual part, wherein a compatible virtual part comprises a virtual port having a first set of properties that match a second set of properties of at least one of the virtual ports in the set of virtual ports, and
wherein each virtual port within the set of virtual ports identifies a set of configuration parameters that are exchanged with a remote virtual part for configuring at least one of the software components of the virtual image with at least one software component of a virtual image in the remote virtual part; and
a set of configuration operations configured to reconfigure the virtual image based on at least one of
  a virtual part associated with the virtual part comprising the set of configuration operations, and
  an operating environment associated with the virtual part comprising the configuration operations.

2. The virtual part of claim 1, further comprising:
a set of product sections, wherein each product section comprises a set of configuration data associated with the at least one parameter of the at least one of the software components of the virtual image.

3. The virtual part of claim 2, wherein each configurability point in the set of configurability points indicates configuration data for the at least one parameter within a product section of the set of product sections that is configurable.

4. The virtual part of claim 1, wherein the set of virtual ports comprises at least one of a client virtual port and a server virtual port comprising a set of properties that are configured based on at least one other virtual port connected to the at least one of a client virtual port and a server virtual port, wherein at least one configuration parameter is transmitted from the at least one other virtual port to the at least one of a client virtual port and a server virtual port for configuring the set of properties.

5. The virtual part of claim 1, wherein the set of virtual ports comprises at least one service virtual port that comprises an individual non-divisible connectivity specification, and wherein the at least one service virtual port comprises a set of properties that are propagated to each virtual port connected to the at least one service virtual port, wherein each virtual port connected to the at least one service port configures a set of software based on the set of properties propagated by the server virtual port.

6. A method, on an information processing system, for creating a virtual part used for composing a virtual solution comprised of a plurality of virtual parts, the method comprising:
receiving a user's selection of at least one virtual image comprising a set of software components, wherein each software component in the set of software components is compatible with each other;
associating a set of configurability points with the virtual image, wherein each configurability point in the set of configurability points defines at least one parameter of at least one of the software components of the virtual image that is configurable during virtual solution composition,
wherein virtual solution composition comprises associating at least a first virtual part to operate with at least a second virtual part;
generating a set of virtual ports, wherein each virtual port within the set of virtual ports indicates at least one of a set of virtual parts required by a virtual part comprising the set of virtual ports and a set of virtual parts that are compatible with the virtual part, wherein a compatible virtual part comprises a virtual port having a first set of properties that match a second set of properties of at least one of the virtual ports in the set of virtual ports,
wherein each virtual port within the set of virtual ports identifies a set of configuration parameters that are exchanged with a remote virtual part for configuring at least one of the software components of the virtual image with at least one software component of a virtual image in the remote virtual part;
receiving a set of configuration operations, wherein the set of configuration operations are configured to reconfigure the virtual image based on at least one of a virtual part associated with the virtual part comprising the set of configuration operations and an operating environment associated with the virtual part comprising the configuration operations; and
generating a virtual part comprising at least the virtual image, the set of configurability points, the set of virtual ports, and the configuration operations.

7. The method of claim 6, further comprising:
generating a set of product sections within the virtual part, wherein each product section comprises a set of configuration data associated with the at least one parameter of the at least one of the software components of the virtual image.

8. The method of claim 7, wherein each configurability point in the set of configurability points indicates configuration data for the at least one parameter within a product section of the set of product sections that is configurable.

9. The method of claim 6, further comprising:
defining at least one virtual port within the set of virtual ports as a client virtual port that comprises properties that are configured based on at least one other virtual port connected to the at least one client virtual port, wherein at least one configuration parameter is transmitted from the at least one other virtual port to the at least one of a client virtual port and a server virtual port for configuring the set of properties.

10. The method of claim 6, further comprising:
defining at least one virtual port within the set of virtual ports as a service virtual port that comprises an individual non-divisible connectivity specification, and wherein the at least one service virtual port comprises a set of properties that are propagated to each virtual port connected to the at least one service virtual port, wherein each virtual port connected to the at least one service port configures a set of software based on the set of properties propagated by the server virtual port.

11. A method, with an information processing system, for composing a virtual solution, the method comprising:
receiving a user's selection of a first virtual part and at least a second virtual part, wherein a virtual part comprises at least:
  a virtual image comprising a set of software components, wherein each software component in the set of software components is compatible with each other,
  a set of configurability points, wherein each configurability point within the set of configurability points defines at least one parameter of at least one of the software components of the virtual image,
  a set of virtual ports, wherein each virtual port within the set of virtual ports indicates at least one of a set of virtual parts required by the virtual part comprising the set of virtual ports and a set of virtual parts that are compatible with the virtual part, wherein a compatible virtual part comprises a virtual port having a first set of properties that match a second set of properties of at least one of the virtual ports in the set of virtual ports, and wherein each virtual port within the set of virtual ports identifies a set of configuration parameters that are exchanged with a remote virtual part for configuring at least one of the software components of the virtual image with at least one software component of a virtual image in the remote virtual part, and a set of configuration operations configured to reconfigure the virtual image;

prompting, in response to receiving the user's selection, for a set of parameter values for at least one of the first and second virtual parts based on the set of configurability points;

receiving the set of parameter values from at least one of the user, and the other one of the first virtual part and the second virtual part;

reconfiguring the virtual image within the at least one of the first and second virtual parts based on the received set of parameter values and the set of configuration operations; and generating, in response to reconfiguring the virtual image, a virtual solution model comprising the first virtual part, the second virtual part, and the virtual image that has been reconfigured.

12. The method of claim 11, wherein the generated virtual solution model is cloud-independent and admits realization in more than one kind of infrastructure cloud.

13. The method of claim 11, wherein the virtual solution model comprises links between the set of virtual ports of the first virtual part and the set of virtual ports of the second virtual part, wherein the links represent communication constraints that are to be satisfied.

14. The method of claim 13, wherein the links are created in the virtual solution model by user input received though wizard interaction from a user or auto-suggested during wizard interaction with the user.

15. The method of claim 13, wherein the set of virtual ports of the first virtual part and the set of virtual ports of the second virtual part negotiate a consistent parameter configuration between them when linked together in the virtual solution model.

16. A system for composing virtual solutions, comprising:
memory for storing at least one virtual image, a first virtual part, and at least a second virtual part;
a processor, communicatively couple with the memory; and
a user interface, communicatively coupled with the processor and the memory, for displaying information to a user and for receiving user input from the user, the processor being adapted to:
receiving a user's selection of a first virtual part and at least a second virtual part, wherein a virtual part comprises at least:
a virtual image comprising a set of software components, wherein each software component in the set of software components is compatible with each other,
a set of configurability points, wherein each configurability point within the set of configurability points defines at least one parameter of at least one of the software components of the virtual image,
a set of virtual ports, wherein each virtual port within the set of virtual ports indicates at least one of a set of virtual parts required by the virtual part comprising the set of virtual ports and a set of virtual parts that are compatible with the virtual part, wherein a compatible virtual part comprises a virtual port having a first set of properties that match a second set of properties of at least one of the virtual ports in the set of virtual ports, and wherein a compatible virtual part comprises a virtual port having a first set of properties that match a second set of properties of at least one of the virtual ports in the set of virtual ports, and
wherein each virtual port within the set of virtual ports identifies a set of configuration parameters that are exchanged with a remote virtual part for configuring at least one of the software components of the virtual image with at least one software component of a virtual image in the remote virtual part, and
a set of configuration operations configured to reconfigure the virtual image;
a set of configuration operations adapted to reconfigure the virtual image;
prompting, in response to receiving the user's selection, for a set of parameter values for at least one of the first and second virtual parts based on the set of configurability points;
receiving the set of parameter values;
reconfiguring the virtual image within the at least one of the first and second virtual parts based on the received set of parameter values and the set of configuration operations; and
generating, in response to reconfiguring the virtual image, a virtual solution model comprising the first virtual part, the second virtual part, and the virtual image that has been reconfigured.

17. The system of claim 16, wherein the virtual solution model comprises links between the set of virtual ports of the first virtual part and the set of virtual ports of the second virtual part, wherein the links represent communication constraints that are to be satisfied.

18. The system of claim 17, wherein the links are created in the virtual solution model by user input received though wizard interaction from a user or auto-suggested during wizard interaction with the user.

19. The system of claim 17, wherein the set of virtual ports of the first virtual part and the set of virtual ports of the second virtual part negotiate a consistent parameter configuration between them when linked together in the virtual solution model, where negotiating a consistent parameter configuration comprises at least determining a set of parameter values are to be propagated between the set of virtual ports of the first virtual part and the set of virtual ports of the second virtual part, wherein the set of parameter values are utilized to consistently configure a first set of parameters at the first virtual part and a second set of parameters at the second virtual part.

20. The system of claim 16, further comprising a virtual solution interactive environment that users interact with via the user interface for composing virtual solutions.

21. The system of claim 20, wherein the virtual solution interactive environment comprises a tool that includes at least one of an application(s), a website, a web application, and a mashup, and that is used for composing virtual solutions.

* * * * *